US012489212B2

(12) United States Patent
Tsai et al.

(10) Patent No.: US 12,489,212 B2
(45) Date of Patent: Dec. 2, 2025

(54) ELECTRONIC DEVICE

(71) Applicant: HUAWEI TECHNOLOGIES CO., LTD., Guangdong (CN)

(72) Inventors: Chih Yu Tsai, Taipei (CN); Chih-Wei Hsu, Taipei (CN); Chien-Ming Lee, Taipei (CN); En Tso Yu, Taipei (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 205 days.

(21) Appl. No.: 18/262,087

(22) PCT Filed: Jan. 7, 2022

(86) PCT No.: PCT/CN2022/070788
§ 371 (c)(1),
(2) Date: Jul. 19, 2023

(87) PCT Pub. No.: WO2022/156550
PCT Pub. Date: Jul. 28, 2022

(65) Prior Publication Data

US 2024/0304998 A1 Sep. 12, 2024

(30) Foreign Application Priority Data

Jan. 22, 2021 (CN) ......................... 202110087334.7

(51) Int. Cl.
*H01Q 9/40* (2006.01)
*H01Q 5/40* (2015.01)
*H01Q 9/04* (2006.01)
*H01Q 9/42* (2006.01)

(52) U.S. Cl.
CPC ............. *H01Q 9/0457* (2013.01); *H01Q 5/40* (2015.01); *H01Q 9/42* (2013.01)

(58) Field of Classification Search
CPC ........... H01Q 9/0457; H01Q 5/40; H01Q 9/42
See application file for complete search history.

(56) References Cited

U.S. PATENT DOCUMENTS

2012/0001815 A1* 1/2012 Wong .................. H01Q 9/0421 343/843
2015/0054699 A1 2/2015 Ali et al.

FOREIGN PATENT DOCUMENTS

CN 105406183 A 3/2016
CN 111193110 A 5/2020
CN 111641040 A 9/2020
CN 111769362 A 10/2020
(Continued)

OTHER PUBLICATIONS

Wei et al., "A Novel Hybrid-Fed Patch Antenna With Pattern Diversity," IEEE Antennas And Wireless Propagation Letters, vol. 9, May 27, 2010, 4 pages.
(Continued)

*Primary Examiner* — Henry Luong
(74) *Attorney, Agent, or Firm* — Fish & Richardson P.C.

(57) ABSTRACT

An electronic device includes a radiator, a first feed circuit, and a second feed circuit. The radiator includes a first branch. The first feed circuit feeds the radiator at a first end of the first branch, and the second feed circuit feeds the radiator at a first position in the first branch. The first position is in an area with a largest current in the first branch when the first feed circuit performs feeding and the second feed circuit does not perform feeding.

20 Claims, 38 Drawing Sheets

(56) References Cited

FOREIGN PATENT DOCUMENTS

| | | |
|---|---|---|
| CN | 112117539 A | 12/2020 |
| CN | 113517557 A | 10/2021 |

OTHER PUBLICATIONS

Extended European Search Report in European Appln. No. 22742029.6, mailed on May 21, 2024, 11 pages.

* cited by examiner (a)

(b)

3.33 GHz (a)

3.75 GHz (b)

3.39 GHz (a)

3.76 GHz (b)

3.48 GHz (a)

3.76 GHz (b)

3.42 GHz
(a)

3.78 GHz
(b)

3.47 GHz (a)

3.74 GHz (b)

ELECTRONIC DEVICE

CROSS-REFERENCE TO RELATED APPLICATIONS

This application is a National Stage of International Patent Application No. PCT/CN2022/070788, filed on Jan. 7, 2022, which claims priority to Chinese Patent Application No. 202110087334.7, filed on Jan. 22, 2021, both of which are hereby incorporated by reference in their entireties.

TECHNICAL FIELD

This application relates to the field of wireless communication, and in particular, to an electronic device.

BACKGROUND

With an increasing requirement of a fifth generation (5G) mobile communication terminal on a transmission speed, development of a sub-6 GHz multi-input multi-output (MIMO) antenna system is accelerated. In the sub-6 GHz MIMO antenna system, a large quantity of antennas can be disposed at both a base station end and a terminal, and data is simultaneously transmitted on a plurality of channels in same time domain and same frequency domain, so that spectral efficiency can be effectively improved and a data transmission speed can be greatly increased. Therefore, the system has become one of technologies valued for developing a next-generation multi-gigabits (multi-Gbps) communication system. However, due to a limited space in an electronic device, if any antenna is not miniaturized enough, it is difficult to apply the antenna to a large-screen narrow-bezel design specification of an intelligent electronic device of today. In addition, in design of a MIMO antenna, when several antennas operating on a same frequency band are jointly disposed in a terminal apparatus with a limited space, there is increasingly great interference between the antennas because the antennas are too close to each other, that is, isolation between the antennas greatly increases. Moreover, an envelope correlation coefficient (ECC) between the antennas may be increased, reducing the data transmission speed. In view of this, a MIMO antenna architecture featuring low coupling and a low ECC becomes an implementation means of a MIMO antenna technology for communication on a sub-6 GHz frequency band. In addition, different countries may use different sub-6 GHz frequency bands (N77/N78/N79). Therefore, how to achieve a MIMO multi-antenna architecture operating on a plurality of frequency bands becomes an important topic of technical research.

SUMMARY

Embodiments of this application provide an electronic device, including a wideband antenna structure for reusing a space. The wideband antenna structure is easy to implement in an architecture of the electronic device and occupies a small area. There is good isolation between and a low ECC for a plurality of antennas in a small space. This meets a requirement of a multi-antenna system, and may provide a technical reference for a solution of an antenna of a 5G electronic device.

According to a first aspect, an electronic device is provided. The electronic device includes a radiator, a first feed unit, and a second feed unit. The radiator includes a first branch. The first feed unit feeds the radiator at a first end of the first branch, and the second feed unit feeds the radiator at a first position in the first branch. The first position is in an area with a largest current in the first branch when the first feed unit performs feeding and the second feed unit does not perform feeding.

According to the technical solution in this embodiment of this application, an antenna structure formed by the radiator, the first feed unit, and the second feed unit includes a first antenna unit formed by the radiator and the first feed unit, and a second antenna unit formed by the radiator and the second feed unit. The first antenna unit and the second antenna unit may share the antenna radiator, to effectively reduce a volume of the antenna structure, and may be applied to an increasingly narrow internal space of an electronic device. In addition, when the first feed unit performs feeding at one end of the first branch, the first antenna unit works in a DM mode. Because a feeding point of the second feed unit on the radiator is in the area with the largest current in the first branch when the first feed unit performs feeding, when the second feed unit performs feeding, the second antenna unit works in a CM mode, and does not affect the DM mode of the first antenna unit. There can be good isolation between the first antenna unit and the second antenna unit.

With reference to the first aspect, in some implementations of the first aspect, the radiator further includes a second branch. One end of the second branch is connected to the first branch, and the radiator has a T-shaped structure.

According to the technical solution in this embodiment of this application, because another radiation branch is added, an additional current path can be added, to increase another resonance, and an operating frequency band of the antenna structure can be extended.

With reference to the first aspect, in some implementations of the first aspect, a distance between a first connection point and a first endpoint of the first branch is less than or equal to a length of the second branch; and the first connection point is a connection point of connection points between the first branch and the second branch that is away from the first feed unit, and the first endpoint of the first branch is an endpoint of the first branch that is away from the first feed unit.

According to the technical solution in this embodiment of this application, when the distance between the first connection point and the first endpoint of the first radiator is equal to the length of the second radiator, an additional current path is added when the first feed unit performs feeding, to add another resonance, so that an operating frequency band of the antenna unit formed by the first feed unit and the radiator can be extended. When the distance between the first connection point and the first endpoint of the first radiator is less than the length of the second radiator, an additional current path is added when the second feed unit performs feeding, to add another resonance, so that an operating frequency band of the antenna unit formed by the second feed unit and the radiator can be extended.

With reference to the first aspect, in some implementations of the first aspect, an end of the second branch that is away from the first branch is bent.

According to the technical solution in this embodiment of this application, the end may be bent on a two-dimensional plane (a plane on which a lateral branch is located), or may be bent in three-dimensional space, for example, bent toward a rear cover or a screen. Selection may be made based on an actual layout inside an electronic device, to further reduce a space in the electronic device that is occupied by the antenna structure.

With reference to the first aspect, in some implementations of the first aspect, lengths of two areas of the first branch on two sides of the first position are the same.

With reference to the first aspect, in some implementations of the first aspect, the first position is at a joint of the first branch and the second branch.

With reference to the first aspect, in some implementations of the first aspect, a length of the first branch is one half of a first wavelength, and the first wavelength is an operating wavelength of an antenna unit formed by the first feed unit or the second feed unit and the radiator.

With reference to the first aspect, in some implementations of the first aspect, a current in the first branch and a current in the second branch that are excited by the first feed unit through feeding flow in a same direction; and a current in the first branch and a current in the second branch that are excited by the second feed unit flow toward the first position.

According to the technical solution in this embodiment of this application, because the first antenna unit formed by the first feed unit and the radiator and the second antenna unit formed by the second feed unit and the radiator work in the DM mode and the CM mode respectively, good isolation can be maintained between the two antenna units on the operating frequency bands.

With reference to the first aspect, in some implementations of the first aspect, the electronic device further includes a first metal component and a second metal component. The first feed unit is electrically connected to the first metal component to indirectly coupled feed the radiator; and the second feed unit is electrically connected to the second metal component to indirectly coupled feed the radiator.

According to the technical solution of this embodiment of this application, the operating frequency band of the antenna structure can be further extended by the indirectly coupled feeding.

With reference to the first aspect, in some implementations of the first aspect, the electronic device further includes a first matching network. The first matching network is provided between the first feed unit and the first metal component, and is configured to extend the operating frequency band of the first antenna unit formed by the first feed unit.

With reference to the first aspect, in some implementations of the first aspect, the electronic device further includes a second matching network. The second matching network is provided between the second feed unit and the second metal component, and is configured to extend the operating frequency band of the second antenna unit formed by the second feed unit.

According to the technical solution in this embodiment of this application, a matching network may be added to the antenna structure of the electronic device, and an additional current path can be added, to increase another resonance, so that the operating frequency band of the antenna structure can be extended.

With reference to the first aspect, in some implementations of the first aspect, the electronic device further includes a rear cover and a support. The first metal component and the second metal component are disposed on a surface of the support; and the radiator is disposed on a surface of the rear cover.

With reference to the first aspect, in some implementations of the first aspect, the operating frequency bands of the first antenna unit formed by the first feed unit and the second antenna unit formed by the second feed unit are the same.

According to the technical solution in this embodiment of this application, the antenna structure may be applied to a MIMO system.

With reference to the first aspect, in some implementations of the first aspect, the operating frequency band of the first antenna unit formed by the first feed unit covers 3.3 GHZ to 3.8 GHz; and the operating frequency band of the second antenna unit formed by the second feed unit covers 3.3 GHZ to 3.8 GHZ.

According to the technical solution in this embodiment of this application, for brevity of description, the 5G frequency band N78 is selected to be the operating frequency band of the antenna structure provided in embodiments of this application. In actual production or design, a parameter, for example, a size of the antenna structure may be changed, so that the antenna structure may cover another frequency band, for example, another 5G frequency band, or may cover a low frequency band (698 MHz to 960 MHZ), a mid frequency band (1,710 MHz to 2,170 MHz), and a high frequency band (2,300 MHz to 2,690 MHz) in LTE, a 2.4 GHZ/5 GHz Wi-Fi frequency band, or the like. This is not limited in this application.

With reference to the first aspect, in some implementations of the first aspect, the electronic device includes an antenna array formed by a plurality of the radiators spaced from each other in order and at least one decoupling element: in two adjacent radiators of the plurality of radiators, a first end of a first branch is close to a second end of another first branch; and the at least one decoupling element is not directly connected to the plurality of radiators, and a corresponding decoupling element of the at least one decoupling element is disposed between the two adjacent radiators.

According to the technical solution of this embodiment of this application, the decoupling element may be configured to enable the antenna array to have a plurality of high isolation points on an operating frequency band, and can improve near-field current coupling between a plurality of subunits.

With reference to the first aspect, in some implementations of the first aspect, the plurality of radiators are distributed to form a triangle, a circle, or a polygon.

According to the technical solution in this embodiment of this application, a quantity of antenna subunits in the antenna array may be adjusted based on an actual requirement of communication.

With reference to the first aspect, in some implementations of the first aspect, operating frequency bands of subunits each formed by one of the radiators in the antenna array are the same.

With reference to the first aspect, in some implementations of the first aspect, there is a gap between the two adjacent radiators and the corresponding decoupling element, and a degree of coupling between the two adjacent radiators is related to a size of the gap.

With reference to the first aspect, in some implementations of the first aspect, the decoupling element is configured to enable the antenna array to have the plurality of high isolation points on the operating frequency bands.

DESCRIPTION OF EMBODIMENTS

Technical solutions of this application are described below with reference to the accompanying drawings.

It should be understood that, in this application, an “electrical connection” may be understood as a manner in which elements or components are physically in contact and electrically conducting: or may be understood as a manner in which different elements or components are connected through a physical line that can transfer an electrical signal in wiring, for example, printed circuit board (PCB) copper foil or a conductive wire. "Communication connection" may refer to electrical signal transmission, including a wireless communication connection and a wired communication connection. The wireless communication connection requires no physical medium, and does not belong to a connection relationship that limits product construction. Both "connection" and "interconnection" may refer to a mechanical connection relationship or a physical connection relationship. For example, a connection between A and B or an interconnection between A and B may mean that there is a fastening component (for example, a screw; a bolt, or a rivet) between A and B, or A and B are in contact with each other and A and B are difficult to be separated.

The technical solutions provided in this application are applicable to an electronic device using one or more of the following communication technologies: a communication technology of Bluetooth (BT), a communication technology of a global positioning system (GPS), a communication technology of wireless fidelity (Wi-Fi), a communication technology of a global system for mobile communications (GSM), a communication technology of wideband code division multiple access (WCDMA), a communication technology of long term evolution (LTE), a 5G communication technology, another future communication technology, and the like. An electronic device in embodiments of this application may be a mobile phone, a tablet computer, a laptop computer, a smart band, a smartwatch, a smart helmet, smart glasses, or the like. The electronic device may alternatively be a cellular phone, a cordless phone, a session initiation protocol (SIP) phone, a wireless local loop (WLL) station, a personal digital assistant (PDA), a handheld device that has a wireless communication function, a computing device, another processing device connected to a wireless modem, a vehicle-mounted device, an electronic device in a 5G network, an electronic device in a public land mobile network (PLMN) evolved in the future, or the like. This is not limited in embodiments of this application.

Figure 1:
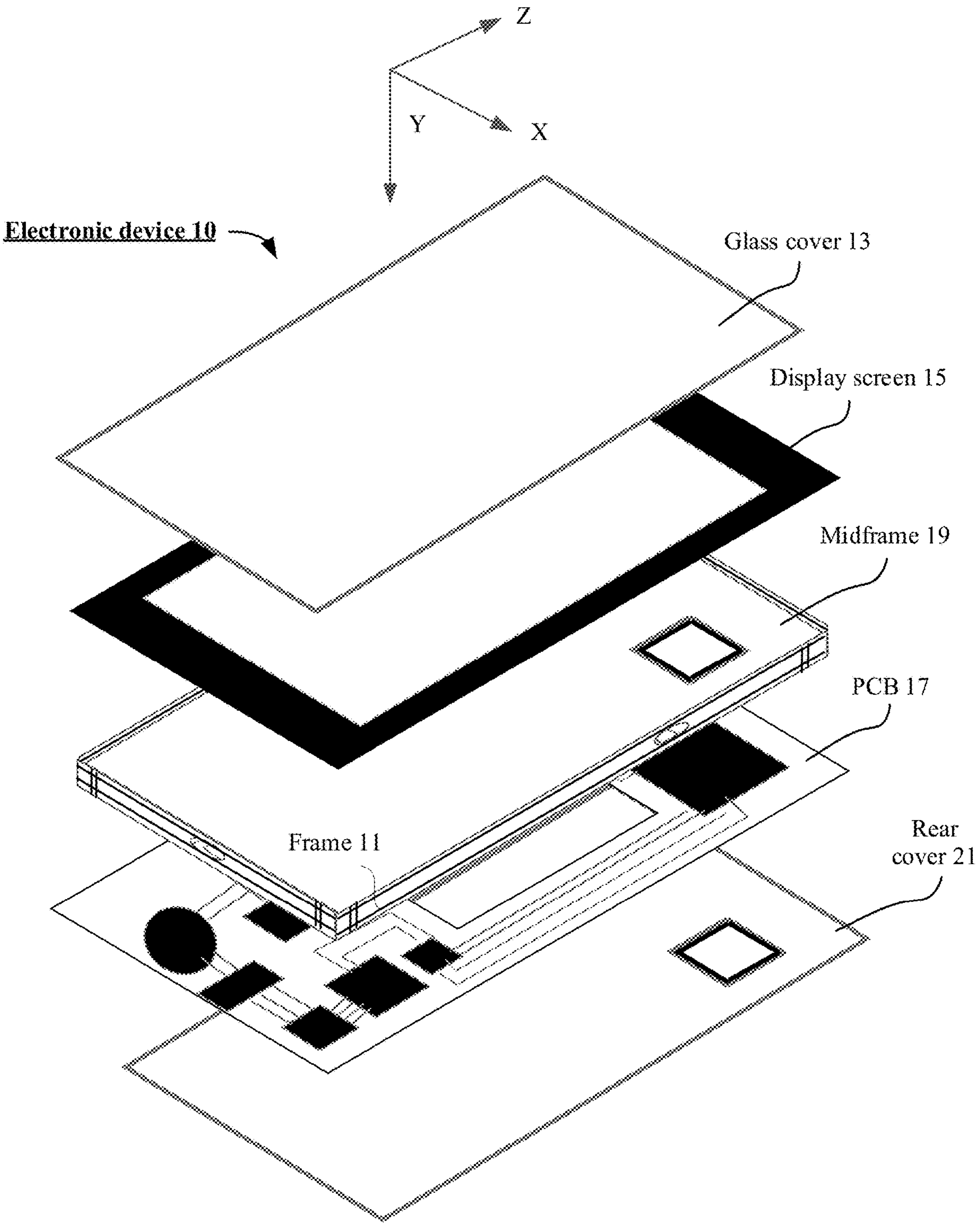
FIG. 1 is a schematic diagram of an electronic device according to an embodiment of this application.

FIG. 1 shows an example of an internal environment of an electronic device according to this application. An example in which the electronic device is a mobile phone is used for description.

As shown in FIG. 1, an electronic device 10 may include a glass cover 13, a display screen 15, a printed circuit board (PCB) 17, a midframe (housing) 19, and a rear cover 21.

The glass cover 13 may be disposed snugly against the display screen 15, and may be mainly used to protect the display screen 15 for dust resistance.

In an embodiment, the display screen 15 may be a liquid crystal display (LCD), a light emitting diode (LED), an organic light-emitting diode (OLED), or the like. This is not limited in this application.

The printed circuit board PCB 17 may be a flame-retardant (FR-4) dielectric board, may be a Rogers dielectric board, or may be a hybrid dielectric board of Rogers and FR-4, or the like. Herein, FR-4 is a grade designation for a flame-retardant material, and the Rogers dielectric board is a high frequency board. A metal layer may be disposed on a side that is of the printed circuit board PCB 17 and that is close to the midframe 19, and the metal layer may be formed by etching metal on a surface of the PCB 17. The metal layer may be used to ground an electronic element carried on the printed circuit board PCB 17, to protect a user from an electric shock or a device from being damaged. The metal layer may be referred to as a PCB ground plane. In addition to the PCB ground plane, the electronic device 10 may further have another ground plane for grounding, for example, a metal midframe.

The electronic device 10 may further include a battery that is not shown herein. The battery may be disposed in the midframe 19. The battery may divide the PCB 17 into a mainboard and a sub-board. The mainboard may be disposed between the midframe 19 and an upper edge of the battery, and the sub-board may be disposed between the midframe 19 and a lower edge of the battery:

The midframe 19 is mainly used to support the whole device. The midframe 19 may include a frame 11, and the frame 11 may be made of a conductive material, for example, metal. The frame 11 may extend around peripheries of the electronic device 10 and the display screen 15. The frame 11 may specifically surround four sides of the display screen 15 to help fix the display screen 15. In an implementation, the frame 11 made of a metal material may be directly used as a metal frame of the electronic device 10 to form an appearance of the metal frame, and is applicable to a metal ID. In another implementation, an outer surface of the frame 11 may be a non-metal material, for example, a plastic frame, to form an appearance of a non-metal frame, and is applicable to a non-metal ID.

The rear cover 21 may be a rear cover made of a metal material, or may be a rear cover made of a non-conductive material, for example, a glass rear cover, a plastic rear cover, or another non-metal rear cover.

FIG. 1 shows only an example of some components included in the electronic device 10. Actual shapes, actual sizes, and actual construction of these components are not limited to those shown FIG. 1.

Figure 2:
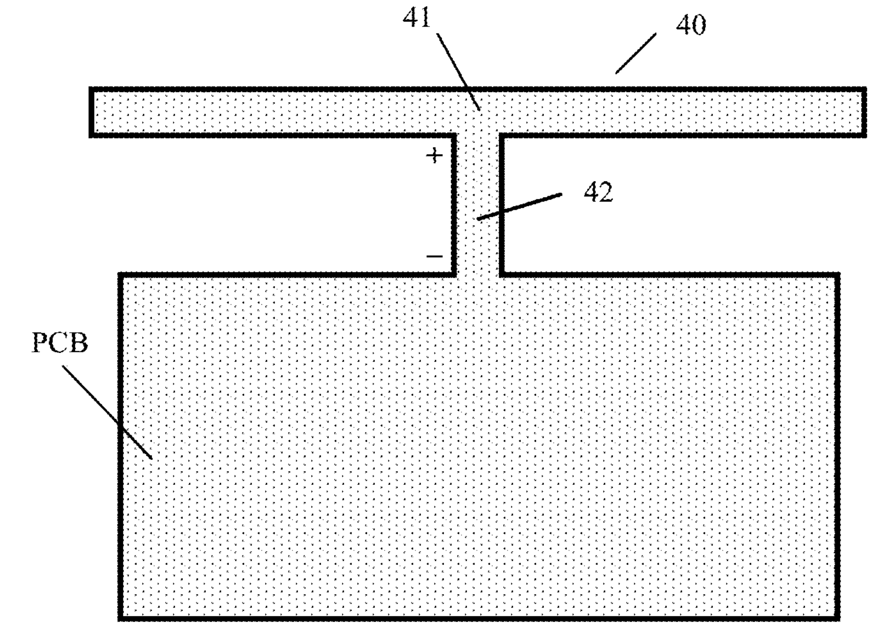
FIG. 2 is a diagram of a common mode structure of a wire antenna and distribution of corresponding currents and electric fields according to this application.
Figure 2:
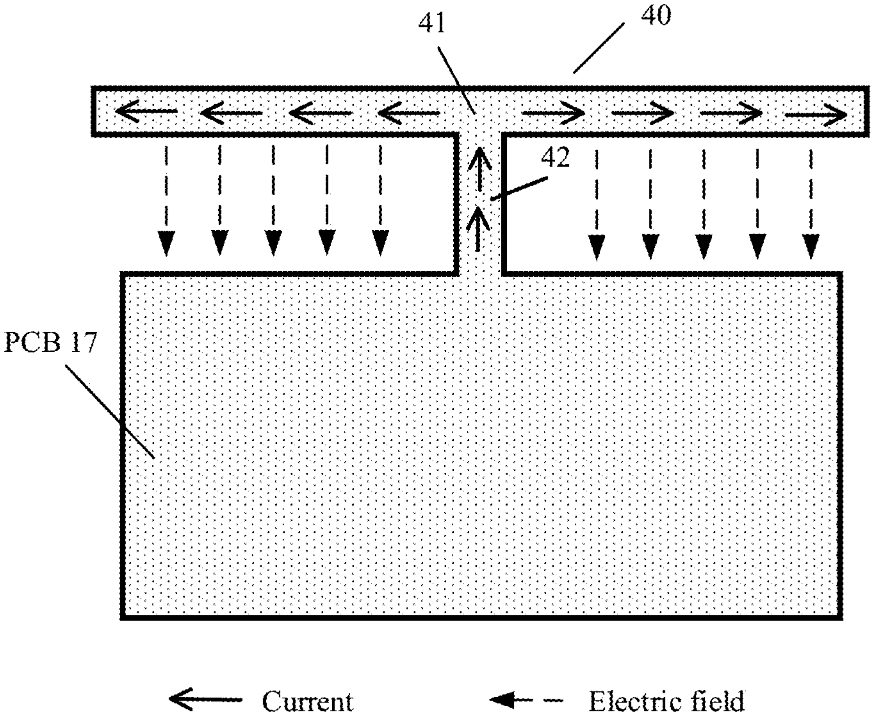
Figure 3:
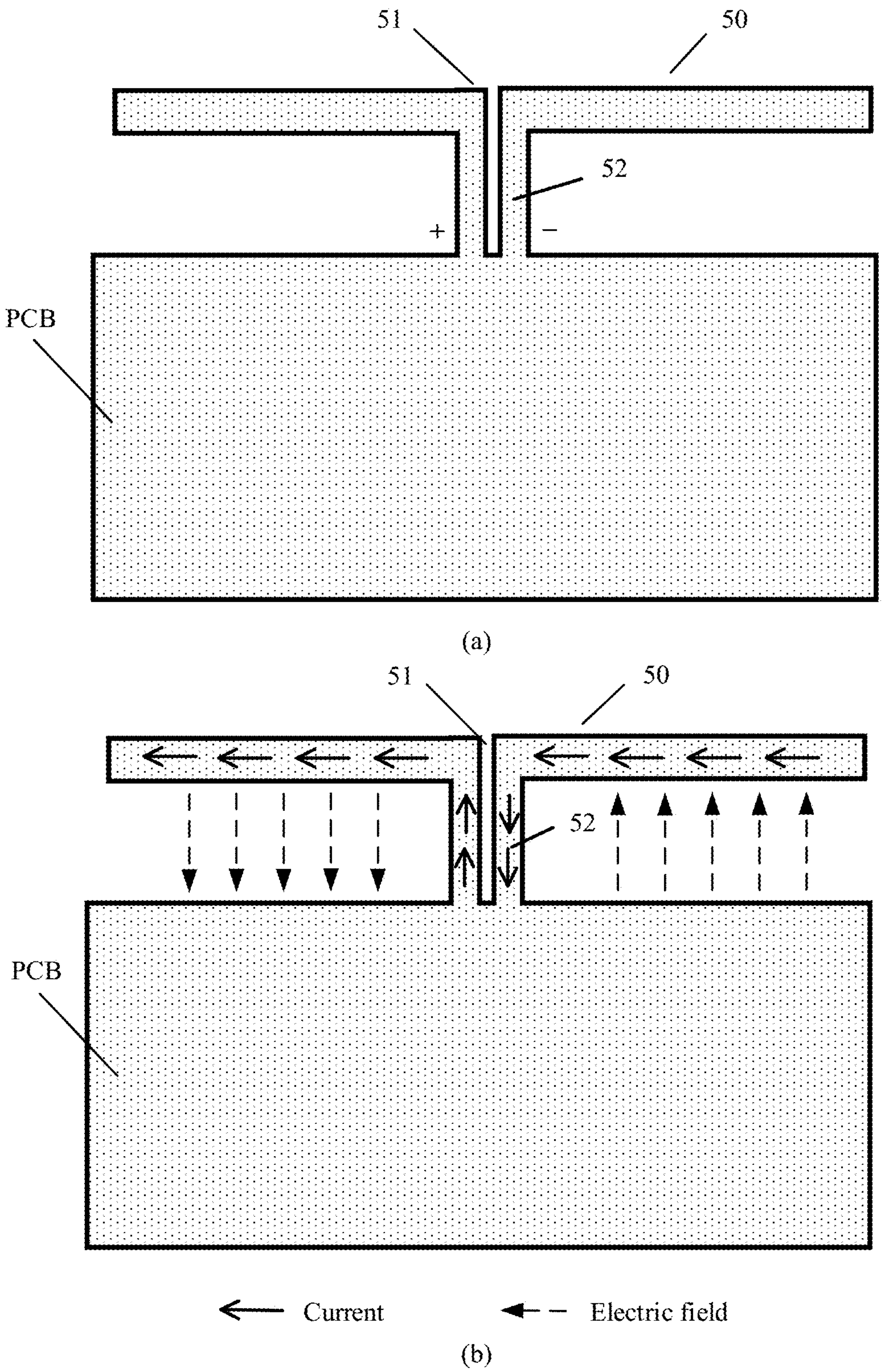
FIG. 3 is a diagram of a differential mode structure of a wire antenna and distribution of corresponding currents and electric fields according to this application.

First, FIG. 2 and FIG. 3 are used to describe two antenna modes used in this application. FIG. 2 is a schematic diagram of a common mode structure of a wire antenna and distribution of corresponding currents and electric fields according to this application. FIG. 3 is a schematic diagram of a differential mode structure of another wire antenna and distribution of corresponding currents and electric fields according to this application.

1. Common Mode (CM) Mode of a Wire Antenna (a) in FIG. 2 shows that a radiator of a wire antenna is connected to ground (for example, a ground plane that may be a PCB) through a feed line 42. A wire antenna 40 is described below. The wire antenna 40 is connected to a feed unit (not shown in the figure) at a middle position 41. A positive electrode of the feed unit is connected to the middle position 41 of the wire antenna 40 through the feed line 42, and a negative electrode of the feed unit is connected to ground. For example, the middle position 41 of the wire antenna 40 may be a geometric center of the wire antenna, or a midpoint of an electrical length of the radiator (or an area within a specific range near the midpoint).

(b) in FIG. 2 shows distribution of currents and electric fields of the wire antenna 40. As shown in (b) in FIG. 2, the currents are symmetrically distributed, for example, reversely distributed, on two sides of the middle position 41. The electric fields are distributed on the two sides of the middle position 41 toward a same direction. As shown in (b) in FIG. 2, currents at the feed line 42 are distributed toward a same direction. As the currents at the feed line 42 are distributed toward a same direction, the feeding shown in (a) in FIG. 2 may be referred to as CM feeding for the wire antenna. As the currents are symmetrically distributed on the two sides of the middle position on the radiator, the wire antenna mode shown in (b) in FIG. 2 may be referred to as a CM mode of the wire antenna. The currents and the electric fields shown in (b) in FIG. 2 may be respectively referred to as CM mode currents and CM mode electric fields of the wire antenna.

The CM mode currents and the CM mode electric fields of the wire antenna are generated by two branches (for example, two horizontal branches) of the wire antenna 40 on the two sides of the middle position 41 that is used as an antenna operating in a quarter-wavelength mode. The currents are stronger at the middle position 41 of the wire antenna 40 and weaker at both ends of the wire antenna 101. The electric fields are weaker at the middle position 41 of the wire antenna 40) and stronger at both ends of the wire antenna 40.

2. Differential Mode (DM) Mode of a Wire Antenna (a) in FIG. 3 shows that a radiator of a wire antenna is connected to ground (for example, a ground plane that may be a PCB) through a feed line 52. A wire antenna 50 is described below. The wire antenna 50 is connected to a feed unit (not shown in the figure) at a middle position 51. A positive electrode of the feed unit is connected to one side of the middle position 51 through the feed line 52, and a negative electrode of the feed unit is connected to the other side of the middle position 51 through the feed line 52. The middle position 51 may be a geometric center of the wire antenna, or a midpoint of an electrical length of the radiator (or an area within a specific range near the midpoint).

(b) in FIG. 3 shows distribution of currents and electric fields of the wire antenna 50. As shown in (b) in FIG. 3, the currents are asymmetrically distributed, for example, distributed toward a same direction, on two sides of the middle position 51. The electric fields are reversely distributed on the two sides of the middle position 51. As shown in (b) in FIG. 3, currents at the feed line 52 are reversely distributed. As the currents at the feed line 52 are reversely distributed, the feeding shown in (a) in FIG. 3 may be referred to as DM feeding for the wire antenna. As the currents are asymmetrically distributed on the two sides of the middle position on the radiator, the wire antenna mode shown in (b) in FIG. 3 may be referred to as a DM mode of the wire antenna. The currents and the electric fields shown in (b) in FIG. 3 may be respectively referred to as DM mode currents and DM mode electric fields of the wire antenna.

The DM mode currents and the DM mode electric fields of the wire antenna are generated by the entire wire antenna 50 that is used as an antenna operating in a half-wavelength mode. The currents are stronger at the middle position 51 of the wire antenna 50 and weaker at both ends of the wire antenna 50. The electric fields are weaker at the middle position 51 of the wire antenna 50) and stronger at both ends of the wire antenna 50.

It should be understood that the antenna structures shown in FIG. 2 and FIG. 3 are merely used as examples. Definitions of the CM mode and the DM mode may alternatively be extended to another form of antenna, for example, an electric dipole antenna or a slot antenna. This is not limited in this application.

Currently; an electronic device is required to be miniaturized, and there is a particularly high requirement on a thickness. As a result, antenna clearance in the electronic device is greatly reduced, and a space for layout is increasingly limited. In addition, many new communication specifications such as a 5G sub-6G frequency band and a low-frequency dual band have emerged, and more antennas need to be deployed in a terminal. In addition, to embrace the 5G era, many countries have released operating frequency bands for 5G mobile communication systems. In the white paper published in June 2017, the Global Mobile Suppliers Association (GSA) points out that the frequency band of 3,300 MHz to 4,200 MHz is the frequency band most likely to be used for 5G in many countries in the future. In June 2017, the Ministry of Industry and Information Technology of the People's Republic of China also released on the official website that the frequency bands of 3,300 MHz to 3,600 MHz and 4,800 MHZ to 5,000 MHz will be used in the first phase of 5G in China, where 3,300 MHz to 3,400 MHZ are used only indoors. In February 2018, the Federal Communications Commission (FCC) of the USA approved that the frequency band of 3,700 MHz to 4,200 MHz can be used for ground mobile communication. Therefore, according to the planning of the countries mentioned above, the frequency band is mainly in the range of 3,300 MHz to 4,200 MHz (N77/N78), so that a design of wideband 5G MIMO antennas can be used in more countries.

This application provides a wideband multi-antenna solution for reusing a space. The solution is easy to implement in an architecture of the electronic device and occupies a small area. There is good isolation between and a low ECC for a plurality of antennas in the small space. This meets a requirement of a multi-antenna system, and may provide a technical reference for a solution of an antenna of a 5G electronic device.

Figure 4:
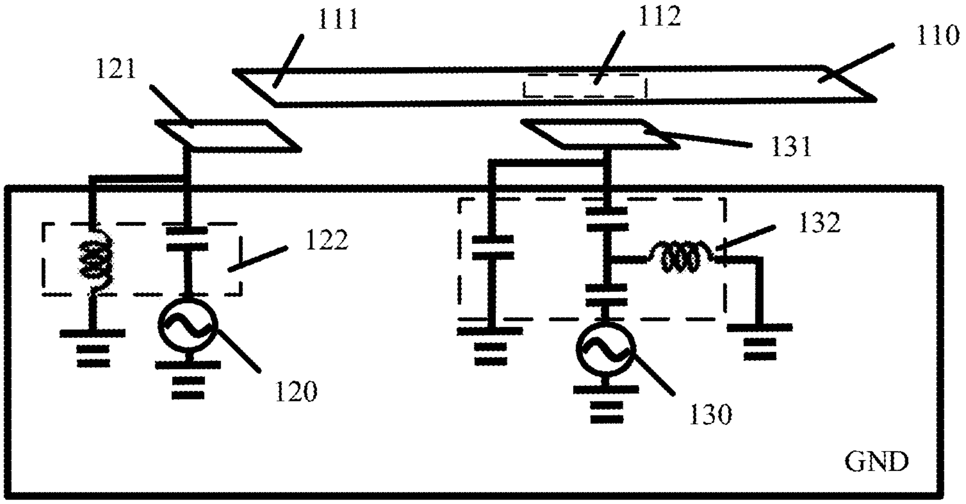
FIG. 4 is a schematic diagram of an antenna structure according to an embodiment of this application.
Figure 5:
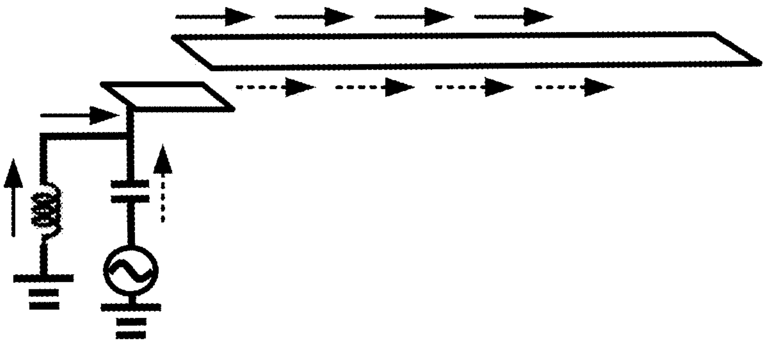
FIG. 5 shows a current path when a first feed unit performs feeding according to an embodiment of this application.
Figure 6:
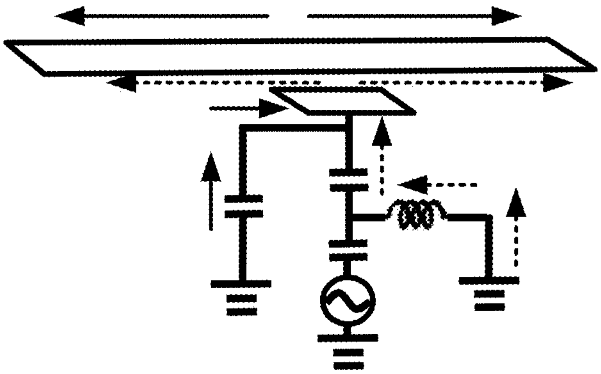
FIG. 6 shows a current path when a second feed unit performs feeding according to an embodiment of this application.
Figure 7:
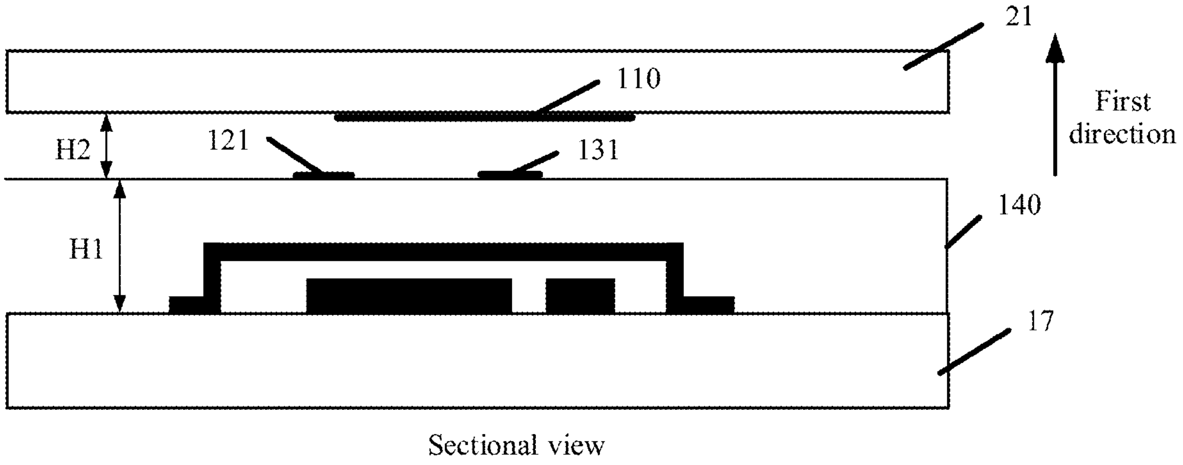
FIG. 7 is a partial branchial view of an electronic device in a first direction according to an embodiment of this application.
Figure 8:
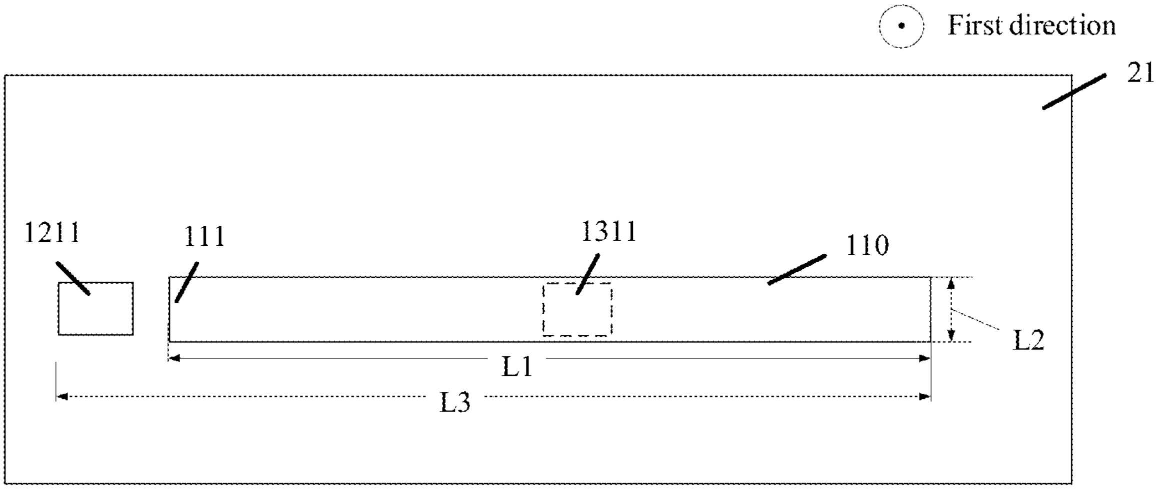
FIG. 8 is a schematic planar diagram of a rear cover of an electronic device according to an embodiment of this application.

FIG. 4 to FIG. 8 are schematic diagrams of an antenna structure according to an embodiment of this application. The antenna may be applied to an electronic device. FIG. 4 is a schematic diagram of an antenna structure according to an embodiment of this application. FIG. 5 shows a current path when a first feed unit performs feeding according to an embodiment of this application. FIG. 6 shows a current path when a second feed unit performs feeding according to an embodiment of this application. FIG. 7 is a partial branchial view of an electronic device in a first direction according to an embodiment of this application. FIG. 8 is a schematic planar diagram of a rear cover of an electronic device according to an embodiment of this application.

As shown in FIG. 4, the antenna structure may include an antenna radiator 110, a first feed unit 120, and a second feed unit 130.

In an embodiment, the first feed unit 120 may be coupled to one end 111 of the antenna radiator 110 to feed the antenna radiator 110. The second feed unit 130 is coupled to a first position 112 on the antenna radiator 110 to feed the antenna radiator 110. The first position 112 may be in an area with a largest current on the antenna radiator 110 when the first feed unit 120 performs feeding. The area with the largest current may be understood as an area, on a first radiator, with strong current, or may be understood as a specific area around a point at which the current is strongest.

The antenna structure formed by the antenna radiator 110, the first feed unit 120, and the second feed unit 130 includes a first antenna unit formed by the antenna radiator 110 and the first feed unit 120, and a second antenna unit formed by the antenna radiator 110 and the second feed unit 130. The first antenna unit and the second antenna unit may share the antenna radiator 110, to effectively reduce a volume of the antenna structure, and may be applied to an increasingly narrow internal space of an electronic device. In addition, when the first feed unit 120 performs feeding at one end 111 of the antenna radiator 110, the first antenna unit works in a DM mode. Because a feeding point of the second feed unit 130 on the antenna radiator 110 is in the area with the largest current on the antenna radiator 110 when the first feed unit 120 performs feeding, when the second feed unit 130 performs feeding, the second antenna unit works in a CM mode, and does not affect the DM mode of the first antenna unit. There can be good isolation between the first antenna unit and the second antenna unit.

In an embodiment, the first position 112 may be a specific area around a midpoint of a length of the antenna radiator 110. For example, lengths of two areas of the antenna radiator 110 on two sides of the first position 112 are the same. That the lengths of the two areas of the antenna radiator 110 on the two sides of the first position 112 are the same may be considered as having a same electrical length. For example, electronic elements may be connected on two sides of the antenna radiator 110, and an electrical length of the antenna radiator 110 is changed, with a physical length of the antenna radiator 110 unchanged. The electrical length may be a product of a physical length (namely, a mechanical length or a geometric length) and a ratio of transmission time of an electrical or electromagnetic signal in a medium to time required for the signal to pass through a distance as long as the physical length of the medium in free space. The electrical length may satisfy the following formula:

$$\bar{L} = L \times \frac{a}{b}$$

L is the physical length, a is the transmission time of an electrical or electromagnetic signal in a medium, and b is the transmission time in free space.

Alternatively, the electrical length may be a ratio of a physical length (namely, a mechanical length or a geometric length) to a wavelength of a transmitted electromagnetic wave. The electrical length may satisfy the following formula:

$$\bar{L} = \frac{L}{\lambda}$$

L is the physical length, and λ is the wavelength of the electromagnetic wave.

It should be understood that one end 111 of the antenna radiator 110 may be considered as a section between a position on the antenna radiator 110 and an endpoint of the antenna radiator 110, and cannot be understood as a point only in a narrow sense. For example, one end 111 of the antenna radiator 110 may be considered as an antenna radiator within a distance that is one eighth of a first wavelength away from the endpoint. The first wavelength may be a wavelength corresponding to an operating frequency band of the first antenna unit or the second antenna unit in the antenna structure, or may be a wavelength corresponding to a center frequency of an operating frequency band of the first antenna unit or the second antenna unit, or a wavelength corresponding to a resonant point of the first antenna unit or the second antenna unit.

In an embodiment, the antenna structure may further include a first matching network 122 between the first feed unit 120 and the antenna radiator 110. As shown in FIG. 5, when the first feed unit 120 performs feeding, the first matching network 122 can generate an additional current path. Therefore, two operating modes can be excited. A plurality of resonances that are generated can extend an operating frequency band of the first antenna unit, to cover a wider communication frequency band, for example, to cover a 5G frequency band N78 (3.3 GHz to 3.9 GHz).

In an embodiment, the antenna structure may further include a second matching network 132 between the second feed unit 130 and the antenna radiator 110. As shown in FIG. 6, when the second feed unit 130 performs feeding, the second matching network 132 can generate an additional current path. Therefore, two operating modes can be excited. A plurality of resonances that are generated can extend an operating frequency band of the second antenna unit, to cover a wider communication frequency band, for example, to cover a 5G frequency band N78 (3.3 GHZ to 3.9 GHZ).

It should be understood that structures of the first matching network 122 and the second matching network 132 shown in FIG. 4 to FIG. 6 are merely used as examples. In actual production or design, the structures may be adjusted based on factors such as a used frequency band. This is not limited in this application.

In addition, the coupling may include indirect coupling and direct coupling. Indirect coupling is a concept relative to direct coupling, that is, spaced coupling, and means that two things are not directly coupled to each other. Direct coupling is a direct connection by coupling. The radiator is electrically connected at the feeding point for direct feeding. When the first feed unit 120 feeds the antenna radiator by indirect coupling, that the first feed unit 120 may be coupled to one end 111 of the antenna radiator 110 may be understood as a connection between the first feed unit 120 and the antenna radiator 110 by indirect coupling in a specific area on an outer side of one end 111 of the antenna radiator 110 by using a metal component 121. For direct coupling, a position at which the feed unit is electrically connected to the antenna radiator is a point or an area, and the feed unit performs feeding at the electrical connection point or in the electrical connection area. However, for indirect coupling, the feed unit and the antenna radiator transmit an electrical signal in a specific area while being spaced, and the feed unit performs feeding in the area.

In an embodiment, the first feed unit 120 may be directly electrically connected (directly coupled) to one end 111 of the antenna radiator 110 to directly feed the antenna structure formed by the antenna radiator 110. The second feed unit 130 may be directly electrically connected to the first position 112 on the antenna radiator 110 to directly feed the antenna structure formed by the antenna radiator 110. This may be adjusted based on a communication requirement of the electronic device and an internal space of the electronic device.

In an embodiment, the first feed unit 120 may be connected to one end 111 of the antenna radiator 110 by indirect coupling by using the metal component 121, to indirectly coupled feed the antenna structure formed by the antenna radiator 110. The second feed unit 130 may also indirectly coupled feed the antenna structure formed by the antenna radiator 110 in a same manner by using a metal component 131. In addition, to implement a structure for indirect coupled feeding, the antenna radiator 110 may be disposed on an internal surface (a surface close to the PCB 17) of the rear cover 21 of the electronic device by a floating metal (FLM) process. FIG. 7 is a partial branchial view of the electronic device in a first direction. For brevity of description, only a branchial view is used to show an antenna structure and a structural relationship between the rear cover 21 and the PCB 17. The first direction is a direction of a plane perpendicular to the rear cover 21. It should be understood that, the plane perpendicular to the rear cover 21 may be understood as a plane at an angle of 90° to a plane on which the rear cover 21 is located. The plane perpendicular to the rear cover 21 is also equivalent to a plane perpendicular to the screen, the midframe, or the mainboard of the electronic device. The metal components 121 and 131 may be disposed on a surface of a support 140. The support 140 may be disposed between the PCB 17 and the rear cover 21, and is configured to support the metal components 121 and 131. A metal layer of the PCB 17 may be used as a ground (GND) plane in this embodiment of this application. The ground plane may be the midframe or another metal layer of the electronic device. In this embodiment of this application, an example in which a size of the ground plane is 140 mm×70) mm is used for description. This is not limited in this application, and may be adjusted based on the internal space of the electronic device.

In an embodiment, the metal components 121 and 131 may be metal stampings. The first feed unit 120 and the second feed unit may indirectly coupled feed the antenna structure by using the metal stampings. In addition, to implement the structure for indirect coupled feeding, the metal components 121 and 131 may be metal patches disposed on the PCB 17 of the electronic device. After the metal patches are disposed on the PCB 17, a distance between the metal patches and a gap becomes larger. Therefore, a coupling area may be correspondingly increased to achieve a same effect. Alternatively, the antenna radiator 110 may be disposed on an outer surface of the rear cover 21 of the electronic device, and the metal components 121 and 131 may be disposed on the internal surface.

It should be understood that, for brevity of description, in this embodiment of this application, an example in which the antenna radiator 110 is disposed on the internal surface of the rear cover 21 of the electronic device and the metal components 121 and 131 are disposed on the surface of the support 140 is used for description. This is not limited in this application, and may be adjusted based on the internal space of the electronic device. For example, the antenna radiator 110 may alternatively be disposed on an upper surface of the support 140, and the metal components 121 and 131 are disposed on a lower surface of the support 140, or the antenna radiator 110 may be disposed on the outer surface of the rear cover 21 of the electronic device, and the metal components 121 and 131 are disposed on the internal surface of the rear cover 21.

In an embodiment, a distance H1 between the support 140 and the PCB 17 may range from 1 mm to 5 mm. In this embodiment of this application, an example in which the distance H1 between the support 140 and the PCB 17 is 2.7 mm is used for description. This is not limited in this application, and may be adjusted based on the internal space of the electronic device.

In an embodiment, a distance H2 between the support 140 and the rear cover 21 may range from 0.1 mm to 1 mm. In this embodiment of this application, an example in which the distance H2 between the support 140 and the rear cover 21 is 0.3 mm is used for description. This is not limited in this application, and may be adjusted based on the internal space of the electronic device.

As shown in FIG. 8, in a schematic planar diagram of the rear cover of the electronic device, first projection 1211 and second projection 1311 are projection, along the first direction, of the metal components 121 and 131 onto the plane on which the rear cover 21 is located. The first feed unit 120 is indirectly coupled to one end 111 of the antenna radiator 110 by using the metal component 121, to feed the antenna structure. The first projection 1211 and the antenna radiator 110 may completely overlap, partially overlap, or not overlap completely. In the embodiment shown in FIG. 8, the antenna radiator 110 and the first projection 1211 do not overlap, that is, the first feed unit 120 feeds the antenna structure by indirect coupling to the outer side of one end 111 of the antenna radiator 110. The first feed unit 130 is indirectly coupled to the first position on the antenna radiator 110 by using the metal component 131, to feed the antenna structure. The second projection 1311 and the antenna radiator 110 may completely overlap or partially overlap. In the embodiment shown in FIG. 8, the antenna radiator 110 and the second projection 1311 completely overlap. It should be understood that, the plane perpendicular to the rear cover 13 may be understood as a plane at an angle of 90° to a plane on which the rear cover 13 is located. It should be understood that, the plane perpendicular to the rear cover is also equivalent to the plane perpendicular to the screen, the midframe, or the mainboard of the electronic device.

In an embodiment, the antenna radiator 110 and the first projection 1211 may alternatively partially overlap or completely overlap. This may be adjusted based on an actual design or production requirement. Similarly, the antenna radiator 110 and the second projection 1311 may alternatively partially overlap.

In an embodiment, a length L1 of the antenna radiator 110 may be one half of a wavelength corresponding to the operating frequency band. The wavelength corresponding to the operating frequency band may be the wavelength corresponding to the center frequency of the operating frequency band, or the wavelength corresponding to a frequency of the resonant point, of the first antenna unit or the second antenna unit. In this embodiment of this application, an example in which the length L1 of the antenna radiator 110 is 30 mm is used for description. This is not limited in this application, and may be adjusted based on the internal space of the electronic device.

In an embodiment, a width L2 of the antenna radiator 110 may be used to adjust a position of a resonant point of the antenna structure. In this embodiment of this application, an example in which the width L2 of the antenna radiator 110 is 5 mm is used for description. This is not limited in this application, and may be adjusted based on the internal space of the electronic device.

In an embodiment, an overall length L3 of the antenna structure may be used to adjust a position of the resonant point of the antenna structure, that is, adjust a feeding position of the first feed unit. When first projection of the first feed unit onto the rear cover completely overlaps with the antenna radiator, the overall length L3 of the antenna structure is the same as the length L1 of the antenna radiator 110. In this embodiment of this application, an example in which the overall length L3 of the antenna structure is 35 mm is used for description. This is not limited in this application, and may be adjusted based on the internal space of the electronic device.

Figure 9:
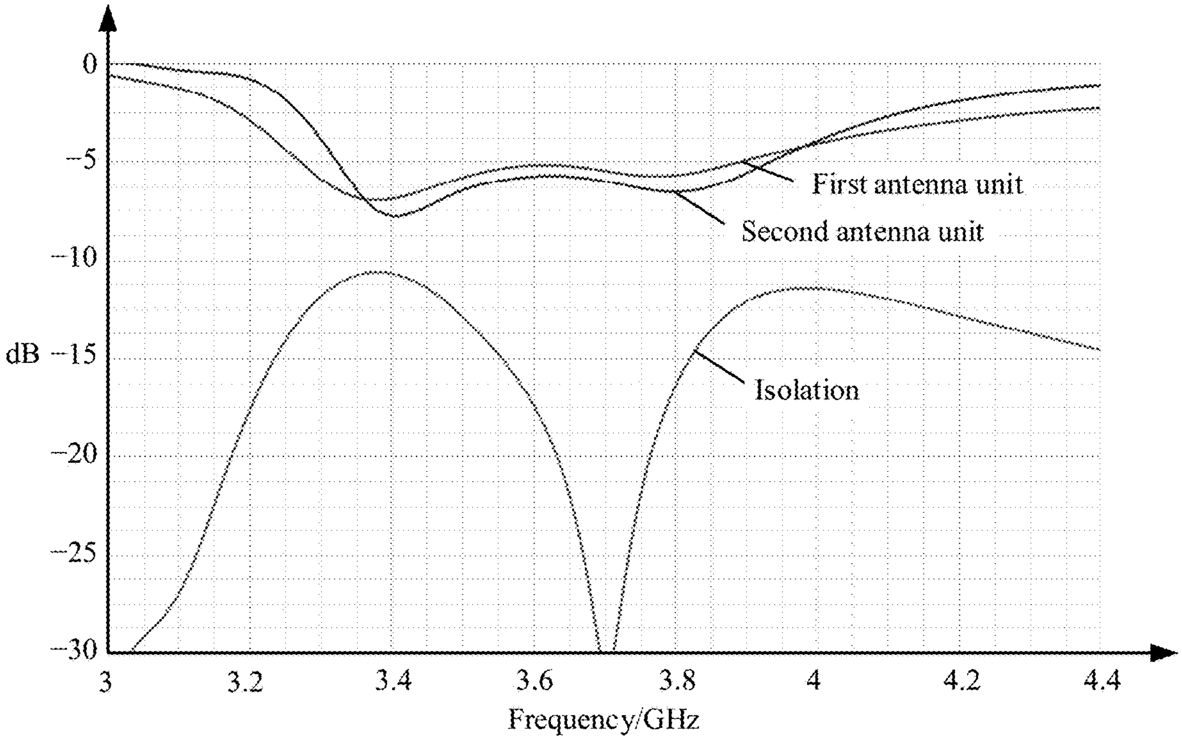
FIG. 9 is a diagram of a simulation result of an S parameter of the antenna structure shown in FIG. 4.
Figure 10:
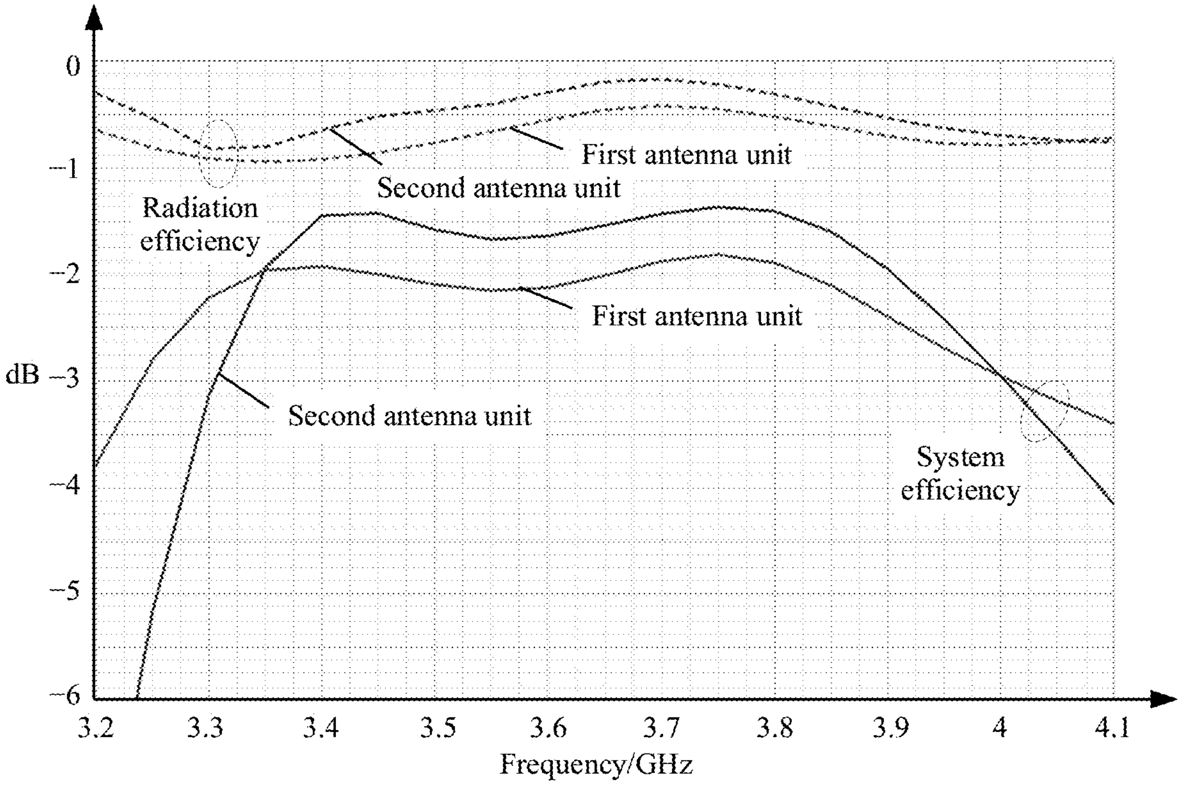
FIG. 10 is a diagram of simulation results of radiation efficiency and system efficiency of the antenna structure shown in FIG. 4.
Figure 11:
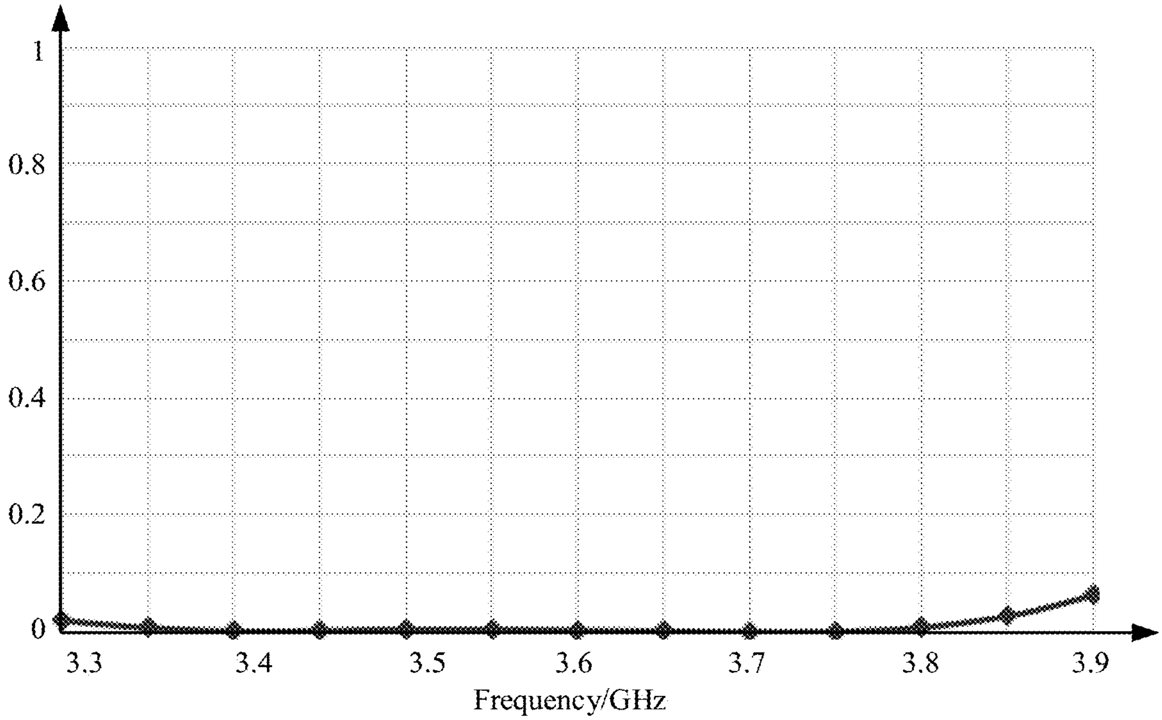
FIG. 11 is a diagram of a simulation result of an ECC of the antenna structure shown in FIG. 4.

FIG. 9 to FIG. 11 are diagrams of simulation results of the antenna structure shown in FIG. 4. FIG. 9 is a diagram of a simulation result of an S parameter of the antenna structure shown in FIG. 4. FIG. 10 is a diagram of simulation results of radiation efficiency and system efficiency (total efficiency) of the antenna structure shown in FIG. 4. FIG. 11 is a diagram of a simulation result of an ECC of the antenna structure shown in FIG. 4.

As shown in FIG. 9, both the operating frequency bands of the first antenna unit formed by the antenna radiator and the first feed unit and the second antenna unit formed by the antenna radiator and the second feed unit can cover a frequency band of 3.3 GHZ to 4 GHZ. In addition, because the first antenna unit and the second antenna unit work in the DM mode and the CM mode respectively, isolation between the two antenna units on the operating frequency bands is greater than 10.5 dB, and there is one high isolation point.

It should be understood that, in this embodiment, for brevity of description, the 5G frequency band N78 is selected to be the operating frequency band of the antenna structure provided in embodiments of this application. In actual production or design, a parameter, for example, a size of the antenna structure may be changed, so that the antenna structure may cover another frequency band, for example, another 5G frequency band, or may cover a low frequency band (698 MHz to 960 MHZ), a mid frequency band (1,710 MHz to 2,170 MHZ), and a high frequency band (2,300 MHz to 2,690 MHZ) in LTE, a 2.4 GHZ/5 GHz Wi-Fi frequency band, or the like. This is not limited in this application.

As shown in FIG. 10, system efficiency of both the first antenna unit and the second antenna unit on the frequency band of 3.3 GHZ to 4 GHz is greater than-3 dB, and radiation efficiency can further meet a communication requirement.

As shown in FIG. 11, ECCs of both the first antenna unit and the second antenna unit are less than 0.1 on the frequency band of 3.3 GHZ to 4 GHZ, and the result is applicable to a MIMO system.

In addition, if the electronic device is close to a human body, the second antenna unit in the antenna structure is used as a transmit antenna, and a result of 10 minus a specific absorption rate (SAR) at 3.45 GHz is 2.261 W/kg, and a result of 10 minus the SAR at 3.8 GHz is 2.92 W/kg. The antenna structure provided in embodiments of this application can still maintain over-the-air (OTA) performance of an antenna while meeting a requirement of laws and regulations for an SAR.

Figure 12:
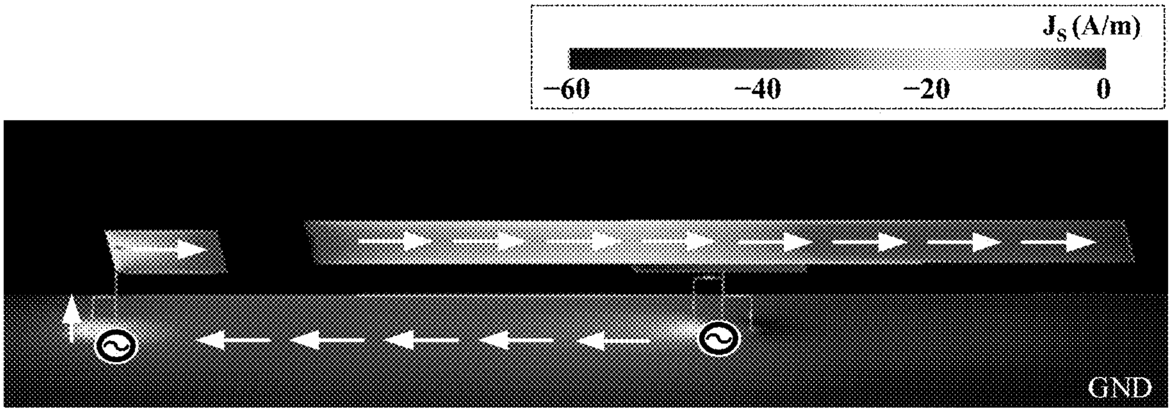
FIG. 12 is a diagram of current distribution of the antenna structure shown in FIG. 4 when the first feed unit performs feeding.
Figure 12:
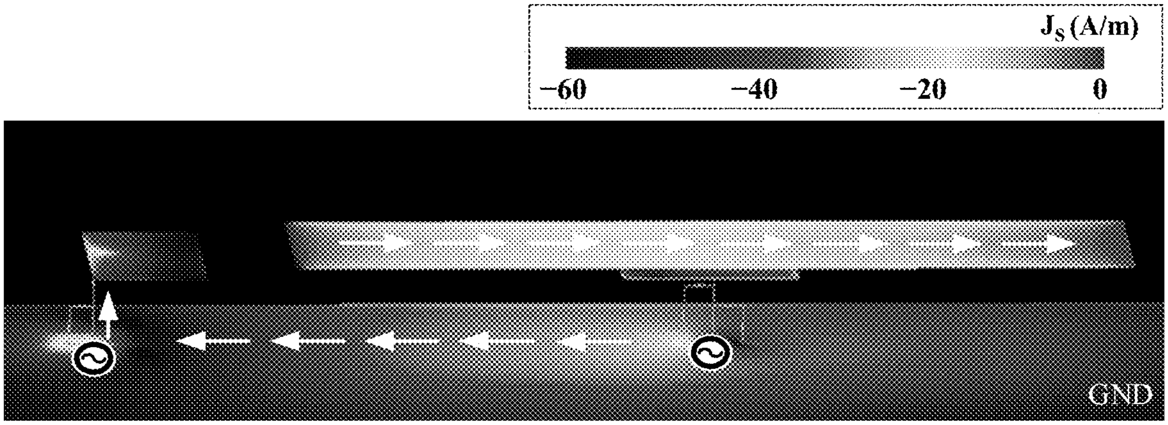
Figure 13:
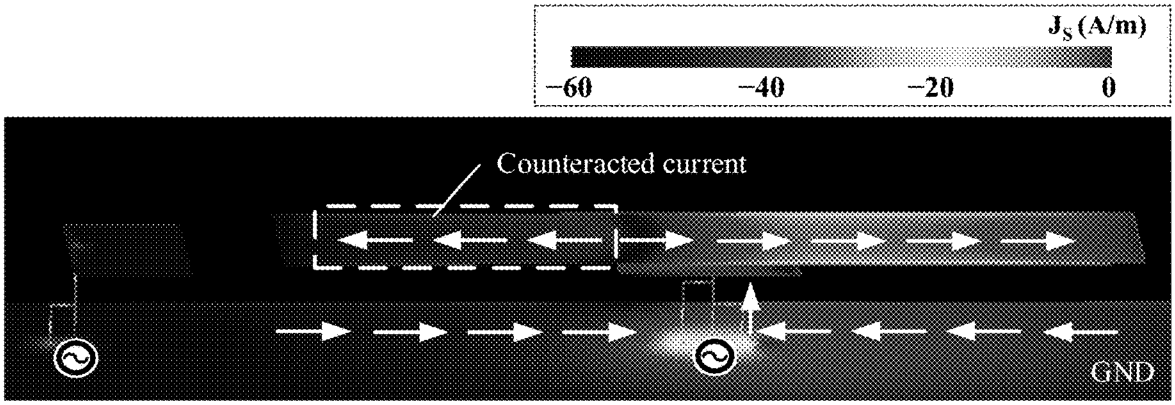
FIG. 13 is a diagram of current distribution of the antenna structure shown in FIG. 4 when the second feed unit performs feeding.
Figure 13:
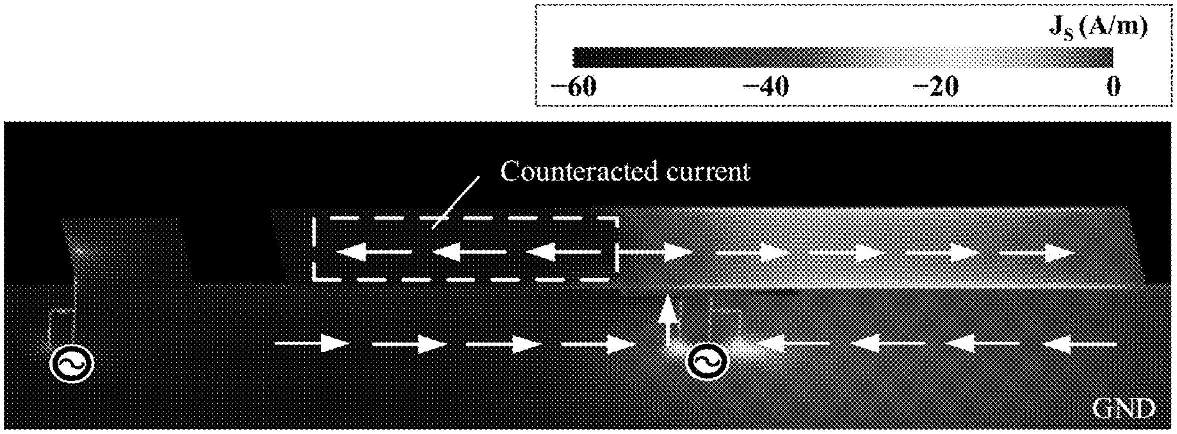

FIG. 12 and FIG. 13 are diagrams of current distribution of the antenna structure shown in FIG. 4. FIG. 12 is a diagram of current distribution of the antenna structure shown in FIG. 4 when the first feed unit performs feeding. FIG. 13 is a diagram of current distribution of the antenna structure shown in FIG. 4 when the second feed unit performs feeding.

As shown in FIG. 12, when the first feed unit performs feeding, because the first matching network generates two current paths, two operating modes can be excited, and two resonances are generated. (a) and (b) in FIG. 12 each correspond to a different current path.

As shown in FIG. 13, when the second feed unit performs feeding, because the second matching network generates two current paths, two operating modes can be excited, and two resonances are generated. (a) and (b) in FIG. 13 each correspond to a different current path.

It should be understood that, as shown in FIG. 12, in a case of 3.33 GHZ and 3.75 GHZ, a differential mode current of the first antenna unit is distributed on all branches of the antenna radiator. However, as shown in FIG. 13, in a case of 3.39 GHZ and 3.76 GHZ, a common mode current of the second antenna unit is distributed on a right branch of the antenna radiator, with a very weak current on a left branch. This is because a differential mode current and the common mode current on the left branch are opposite in direction and counteract each other, and current coupling between the first feed unit and the second feed unit can be effectively reduced, so that good isolation can be maintained between the first antenna unit and the second antenna unit.

Figure 14:
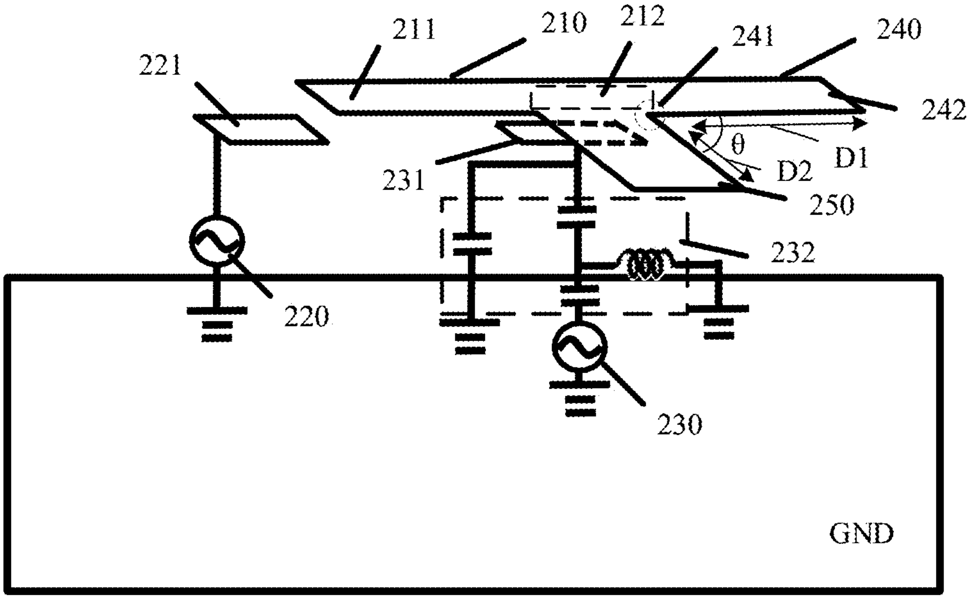
FIG. 14 is a schematic diagram of an antenna structure according to an embodiment of this application.
Figure 15:
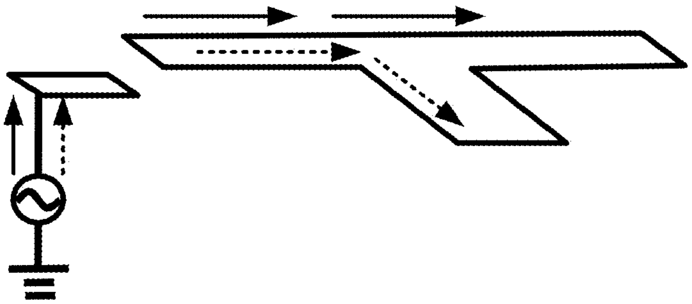
FIG. 15 shows a current path when a first feed unit performs feeding according to an embodiment of this application.
Figure 16:
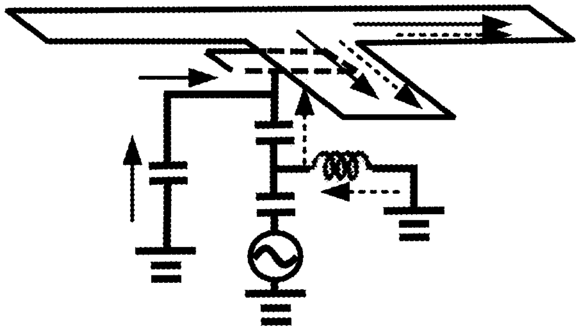
FIG. 16 shows a current path when a second feed unit performs feeding according to an embodiment of this application.

FIG. 14 to FIG. 16 are schematic diagrams of an antenna structure according to an embodiment of this application. The antenna may be applied to an electronic device. FIG. 14 is a schematic diagram of an antenna structure according to an embodiment of this application. FIG. 15 shows a current path when a first feed unit performs feeding according to an embodiment of this application. FIG. 16 shows a current path when a second feed unit performs feeding according to an embodiment of this application.

As shown in FIG. 14, the antenna structure may include an antenna radiator 210, a first feed unit 220, and a second feed unit 230.

The antenna radiator 210 may include a lateral branch 240 and a longitudinal branch 250. The lateral branch 240 is connected to one end of the longitudinal branch 250 to form a T-shaped structure. The first feed unit 120 may be coupled to one end 211 of the lateral branch 240) to feed the antenna radiator 210. The second feed unit 130 is coupled to a first position 212 on the lateral branch 240 to feed the antenna radiator 210. The first position 212 may be at a joint of the lateral branch 240) and the longitudinal branch 250. For example, an area in which the lateral branch 240) is connected to the longitudinal branch 250 covers the first position 212. The first position 212 may be in an area with a largest current on the antenna radiator 210 when the first feed unit 220 performs feeding. Compared with the antenna structure shown in FIG. 4, the longitudinal branch is added to the radiator in the antenna structure shown in FIG. 14. It should be understood that, parts of the structure shown in FIG. 14 that are the same as or similar to those shown in FIG. 4 have same or similar functions.

It should be understood that, because a layout inside the electronic device is increasingly compact, a space for the antenna structure may be insufficient. Therefore, an angle θ between the lateral branch 240) and the longitudinal branch 250 that form the T-shaped structure may be 90°, or may not be 90°. For example, the lateral branch 240 may rotate in a plane about a first connection point 241, for example, θ may range from 30° to 150°. Alternatively, in some cases, the lateral branch 240 may rotate in a curved surface about the first connection point 241. Alternatively, in some cases, the lateral branch 240 may rotate in three dimensions about the first connection point 241, so that the antenna radiator has a structure of stairways. This is not limited in this application, and may be adjusted based on the layout inside the electronic device.

In an embodiment, the lateral branch 240) and the longitudinal branch 250 may form a linear radiator, for example, may be a straight radiator or broken-line radiator. This may be adjusted based on the layout inside the electronic device.

In an embodiment, a distance D1 between the first connection point 241 and a first endpoint 242 of the lateral branch 240 is the same as a length D2 of the longitudinal branch 250. The first connection point 241 is a connection point of connection points between the lateral branch 240 and the longitudinal branch 250 that is away from the first feed unit 220. The first endpoint 242 is an endpoint of the lateral branch 240 that is away from the first feed unit 220.

In an embodiment, lengths of two areas of the lateral branch 240 on two sides of the first position 212 are the same. For example, the first position 212 may be a specific area around a midpoint of a length of the lateral branch 240.

In an embodiment, the first feed unit 220 may be directly coupled to one end 211 of the lateral branch 240 to directly feed the antenna structure formed by the antenna radiator 210. The second feed unit 230 may be directly coupled to the first position 212 on the lateral branch 240 to directly feed the antenna structure formed by the antenna radiator 210.

In an embodiment, the first feed unit 220 may be coupled to one end 211 of the lateral branch 240 by indirect coupling by using a metal component 221, to indirectly coupled feed the antenna structure formed by the antenna radiator 210. The second feed unit 230 may also indirectly coupled feed the antenna structure formed by the antenna radiator 210 in a same manner by using a metal component 231.

As shown in FIG. 15, because the antenna radiator 210 includes the lateral branch 240) and the longitudinal branch 250, when the first feed unit 220 performs feeding, two current paths can be generated on the antenna radiator 210. Therefore, two operating modes can be excited. A current in one of the operating modes generates a resonance along the lateral branch 240, and a current in the other operating mode generates a resonance along a left branch of the lateral branch 240) and the longitudinal branch 250, so that an operating frequency band of the first antenna unit formed by the antenna radiator 210 and the first feed unit 220 can be extended, to cover a wider communication frequency band, for example, to cover a 5G frequency band N78 (3.3 GHZ to 3.9 GHz).

In an embodiment, the antenna structure may further include a matching network 232 between the second feed unit 230 and the metal component 231. As shown in FIG. 16, when the second feed unit 230 performs feeding, the matching network 232 can generate an additional current path. Therefore, two operating modes can be excited. Currents in the two operating modes can both generate resonances along the longitudinal branch 250 and a right branch of the lateral branch 240. The plurality of generated resonances can extend an operating frequency band of the second antenna unit formed by the antenna radiator 210 and the second feed unit 230, to cover a wider communication frequency band, for example, to cover a 5G frequency band N78 (3.3 GHZ to 3.9 GHZ).

In an embodiment, the length of the lateral branch 240 may be one half of a wavelength corresponding to the operating frequency band. The wavelength corresponding to the operating frequency band may be the wavelength corresponding to the center frequency of the operating frequency band, or the wavelength corresponding to a frequency of the resonant point, of the first antenna unit or the second antenna unit. In this embodiment of this application, an example in which the length of the lateral branch 240 is 32 mm is used for description. This is not limited in this application, and may be adjusted based on an internal space of the electronic device.

In an embodiment, widths of the lateral branch 240 and the longitudinal branch 250) may adjust a position of a resonant point of the antenna structure, and the widths of the lateral branch 240) and the longitudinal branch 250 may be the same or may be different. In this embodiment of this application, an example in which the widths of the lateral branch 240) and the longitudinal branch 250) are 5 mm is used for description. In this embodiment, because the distance D1 between the first connection point 241 and the first endpoint 242 of the lateral branch 240) is the same as the length D2 of the longitudinal branch 250, in this embodiment of this application, D1=D2=13.5 mm is used as an example for description. This is not limited in this application, and may be adjusted based on the internal space of the electronic device.

In an embodiment, an overall length of the antenna structure may be used to adjust a position of the resonant point of the antenna structure, that is, adjust a feeding position of the first feed unit. When first projection of the first feed unit onto the rear cover completely overlaps with the lateral branch, the overall length of the antenna structure is the same as the length of the lateral branch. In this embodiment of this application, an example in which the overall length of the antenna structure is 36 mm is used for description. This is not limited in this application, and may be adjusted based on the internal space of the electronic device.

Figure 17:
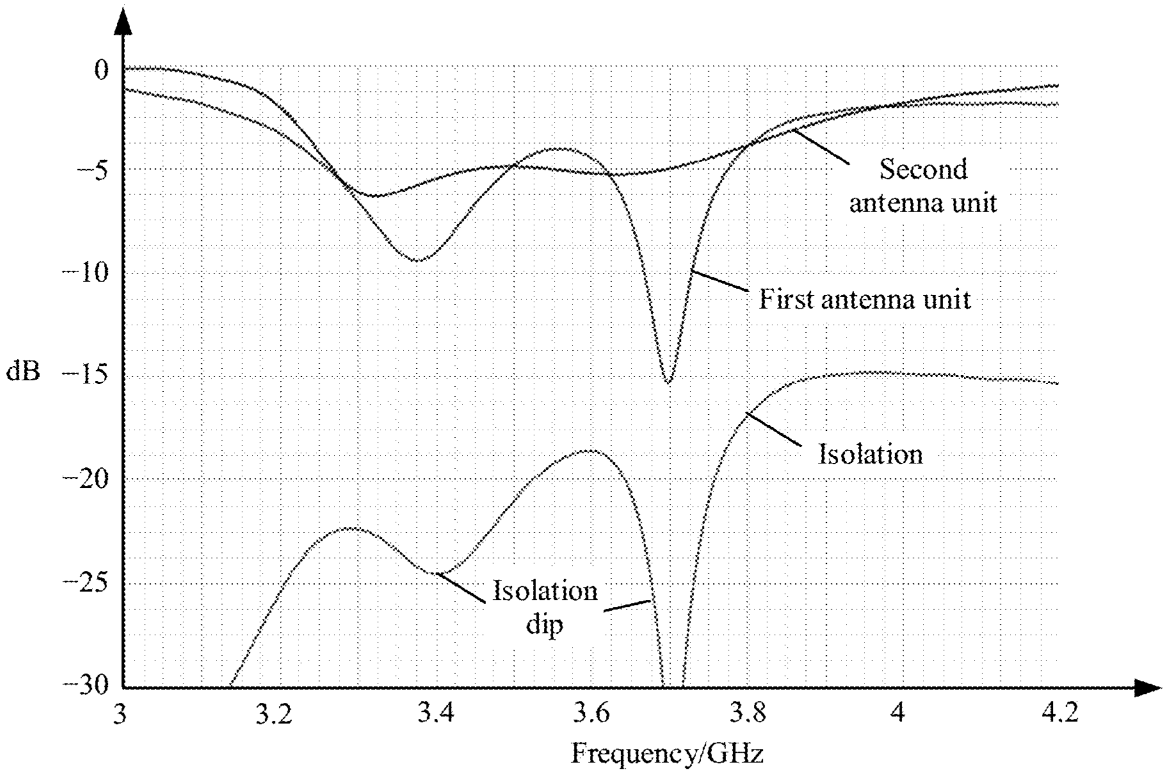
FIG. 17 is a diagram of a simulation result of an S parameter of the antenna structure shown in FIG. 14.
Figure 18:
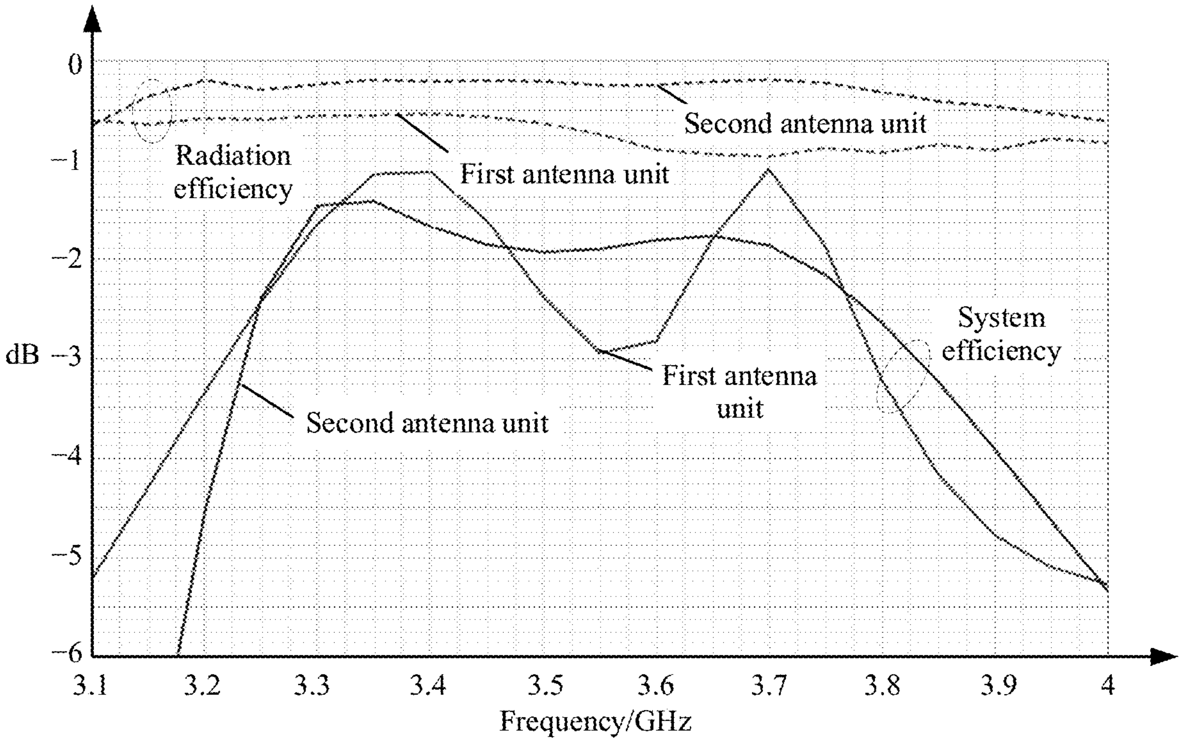
FIG. 18 is a diagram of simulation results of radiation efficiency and system efficiency of the antenna structure shown in FIG. 14.
Figure 19:
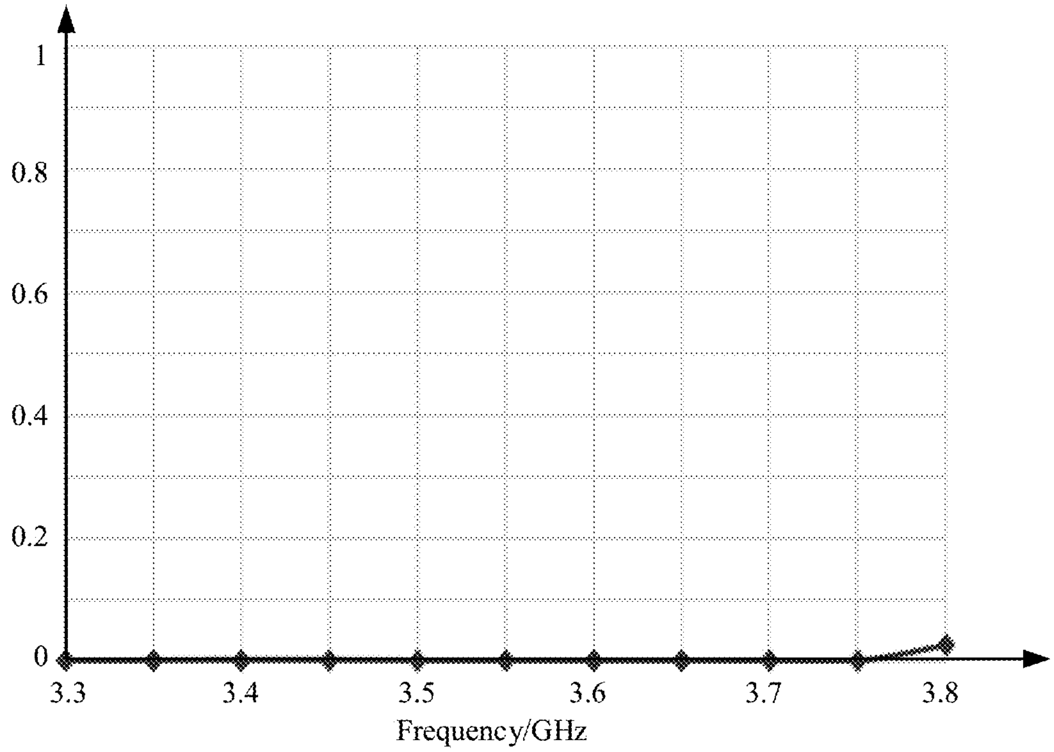
FIG. 19 is a diagram of a simulation result of an ECC of the antenna structure shown in FIG. 14.

FIG. 17 to FIG. 19 are diagrams of simulation results of the antenna structure shown in FIG. 14. FIG. 17 is a diagram of a simulation result of an S parameter of the antenna structure shown in FIG. 14. FIG. 18 is a diagram of simulation results of radiation efficiency and system efficiency of the antenna structure shown in FIG. 14. FIG. 19 is a diagram of a simulation result of an ECC of the antenna structure shown in FIG. 14.

As shown in FIG. 19, both the operating frequency bands of the first antenna unit formed by the antenna radiator and the first feed unit and the second antenna unit formed by the antenna radiator and the second feed unit can cover a frequency band of 3.3 GHz to 3.8 GHZ. In addition, because the first antenna unit and the second antenna unit work in the DM mode and the CM mode respectively, isolation between the two antenna units on the operating frequency bands is greater than 16.8 dB, and there are two high isolation points.

It should be understood that, in this embodiment, for brevity of description, the 5G frequency band N78 is selected to be the operating frequency band of the antenna structure provided in embodiments of this application. In actual production or design, a parameter, for example, a size of the antenna structure may be changed, so that the antenna structure may cover another frequency band, for example, another 5G frequency band, or may cover a low frequency band (698 MHz to 960 MHZ), a mid frequency band (1,710 MHz to 2,170 MHZ), and a high frequency band (2,300 MHz to 2,690 MHZ) in LTE, a 2.4 GHZ/5 GHz Wi-Fi frequency band, or the like. This is not limited in this application.

As shown in FIG. 18, system efficiency of both the first antenna unit and the second antenna unit on the frequency band of 3.3 GHZ to 3.8 GHz is greater than-3 dB, and radiation efficiency can further meet a communication requirement.

As shown in FIG. 19, ECCs of both the first antenna unit and the second antenna unit are less than 0.1 on the frequency band of 3.3 GHZ to 3.8 GHZ, and the result is applicable to a MIMO system.

In addition, if the electronic device is close to a human body, the second antenna unit in the antenna structure is used as a transmit antenna, and a result of 10 minus a SAR at 3.35 GHZ is 1.762 W/kg, and a result of 10 minus the SAR at 3.65 GHz is 1.99 W/kg. This is because an electric field of the second antenna unit working in the CM mode is symmetrically distributed (toward a same direction) on two sides of the antenna radiator, and a magnetic field is anti-symmetrically distributed (reversely). Therefore, magnetic fields at a central position (the first position) on the antenna radiator counteract each other, so that the central position is a null point in the fields. Therefore, the second antenna unit features a low SAR. The antenna structure provided in embodiments of this application can still maintain OTA performance of an antenna while meeting a requirement of laws and regulations for an SAR.

Figure 20:
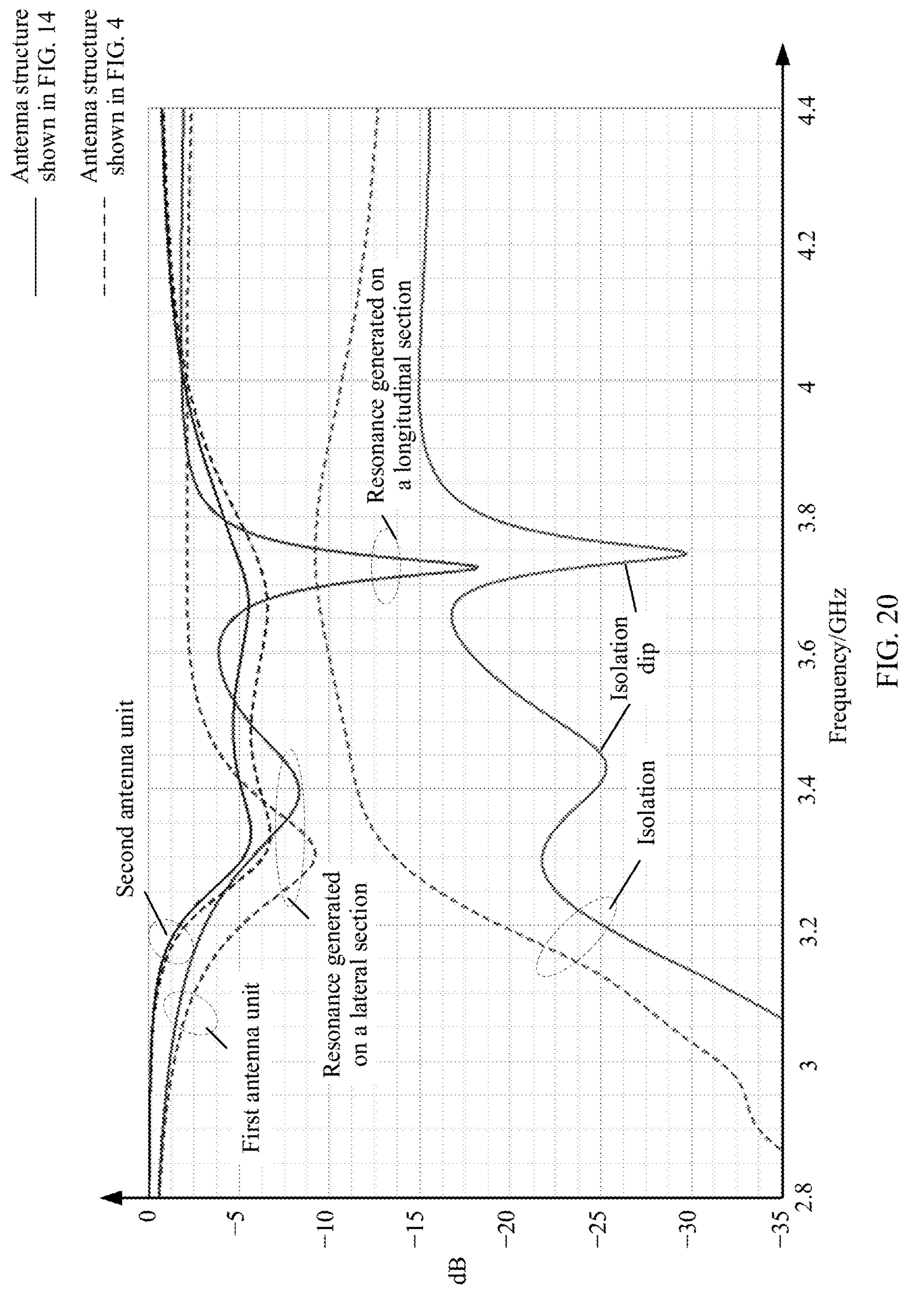
FIG. 20 is a diagram of a simulation result of an S parameter of the antenna structure shown in FIG. 14.

FIG. 20 is a diagram of a simulation result of an S parameter of the antenna structure shown in FIG. 14.

It should be understood that, compared with the antenna structure shown in FIG. 4, the longitudinal branch is added to the antenna structure shown in FIG. 14. When the matching network is added at the second feed unit in the antenna structure shown in FIG. 14 and the antenna structure shown in FIG. 4, but a feeding network is not added at the first feed unit, the simulation results of the S parameters of the antenna structure shown in FIG. 14 and the antenna structure shown in FIG. 4 are shown in FIG. 20.

After the longitudinal branch is added to the radiator in the antenna structure, another current path is added, and the antenna structure can excite another mode at a high frequency. As shown in FIG. 20, resonances generated by the two modes are used to extend a bandwidth of the antenna structure that may cover, for example, the 5G frequency band N78.

In addition, after the longitudinal branch is added to the radiator in the antenna structure, a high isolation point can be added at a high frequency, as shown in FIG. 20, to effectively improve isolation between the first antenna unit and the second antenna unit on the operating frequency band.

Figure 21:
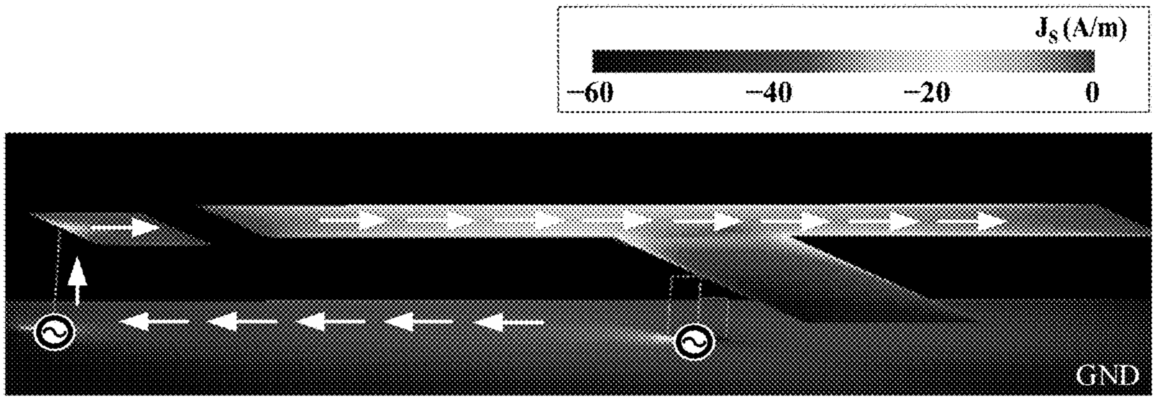
FIG. 21 is a diagram of current distribution of the antenna structure shown in FIG. 14 when the first feed unit performs feeding.
Figure 21:
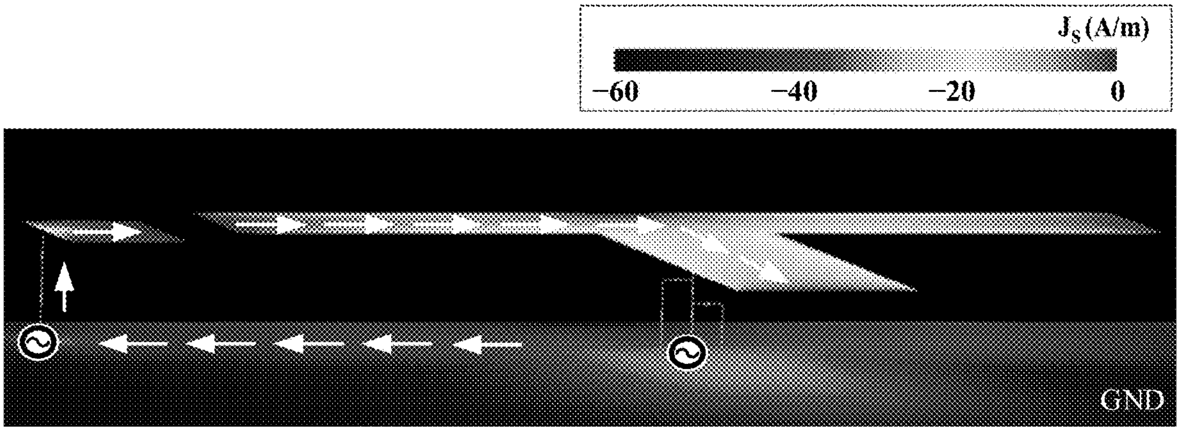
Figure 22:
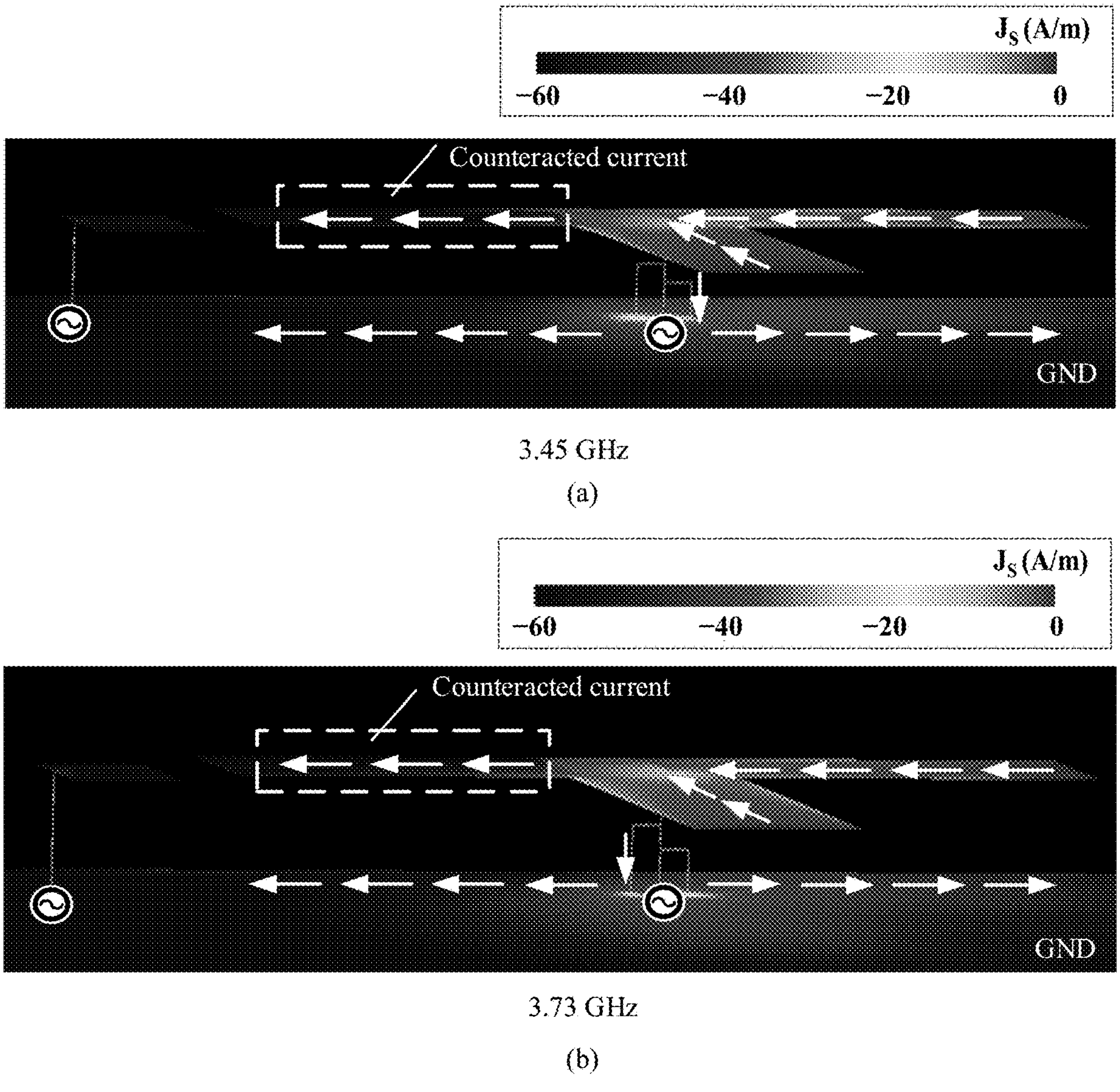
FIG. 22 is a diagram of current distribution of the antenna structure shown in FIG. 14 when the second feed unit performs feeding.

FIG. 21 and FIG. 22 are diagrams of current distribution of the antenna structure shown in FIG. 14. FIG. 21 is a diagram of current distribution of the antenna structure shown in FIG. 14 when the first feed unit performs feeding. FIG. 22 is a diagram of current distribution of the antenna structure shown in FIG. 14 when the second feed unit performs feeding.

As shown in FIG. 21, when the first feed unit performs feeding, because the antenna radiator includes the lateral branch and the longitudinal branch, two current paths can be generated. Correspondingly, two operating modes can be excited, and two resonances are generated. (a) and (b) in FIG. 21 each correspond to a different current path.

As shown in FIG. 22, when the second feed unit performs feeding, because the matching network generates two current paths, two operating modes can be excited, and two resonances are generated. (a) and (b) in FIG. 22 each correspond to a different current path.

It should be understood that, as shown in FIG. 21, in a case of 3.48 GHZ, a differential mode current of the first antenna unit is mainly distributed on the lateral branch. However, in a case of 3.76 GHZ, the differential mode current of the first antenna unit is mainly distributed on the longitudinal branch. Therefore, the two resonances generated by the first antenna unit are completed commonly by the lateral branch and the longitudinal branch. However, as shown in FIG. 22, in a case of 3.45 GHZ and 3.73 GHZ, a common mode current of the second antenna unit is distributed on a right branch of the lateral branch, with a very weak current on a left branch of the lateral branch. This is because a differential mode current and the common mode current on the left branch of the lateral branch are opposite in direction and counteract each other, and current coupling between the first feed unit and the second feed unit can be effectively reduced, so that good isolation can be maintained between the first antenna unit and the second antenna unit.

Figure 23:
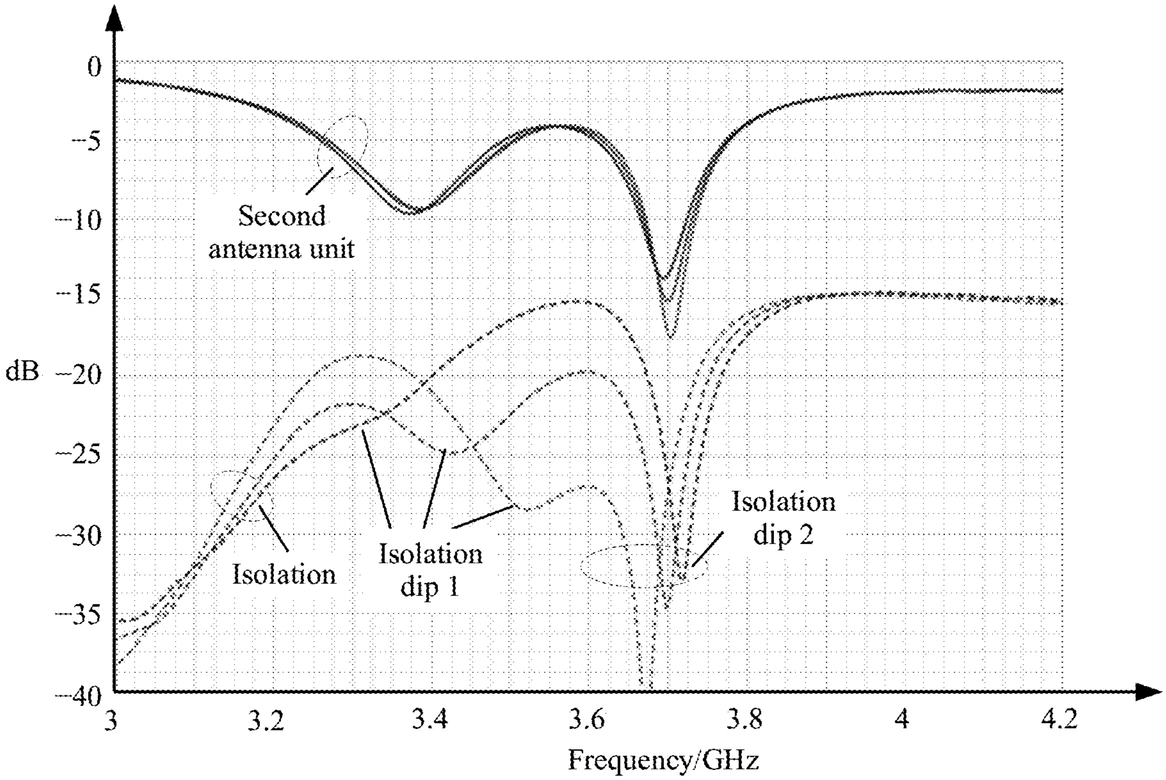
FIG. 23 is a diagram of a simulation result of an S parameter of a length change of a right branch of a lateral branch in the antenna structure shown in FIG. 14.
Figure 24:
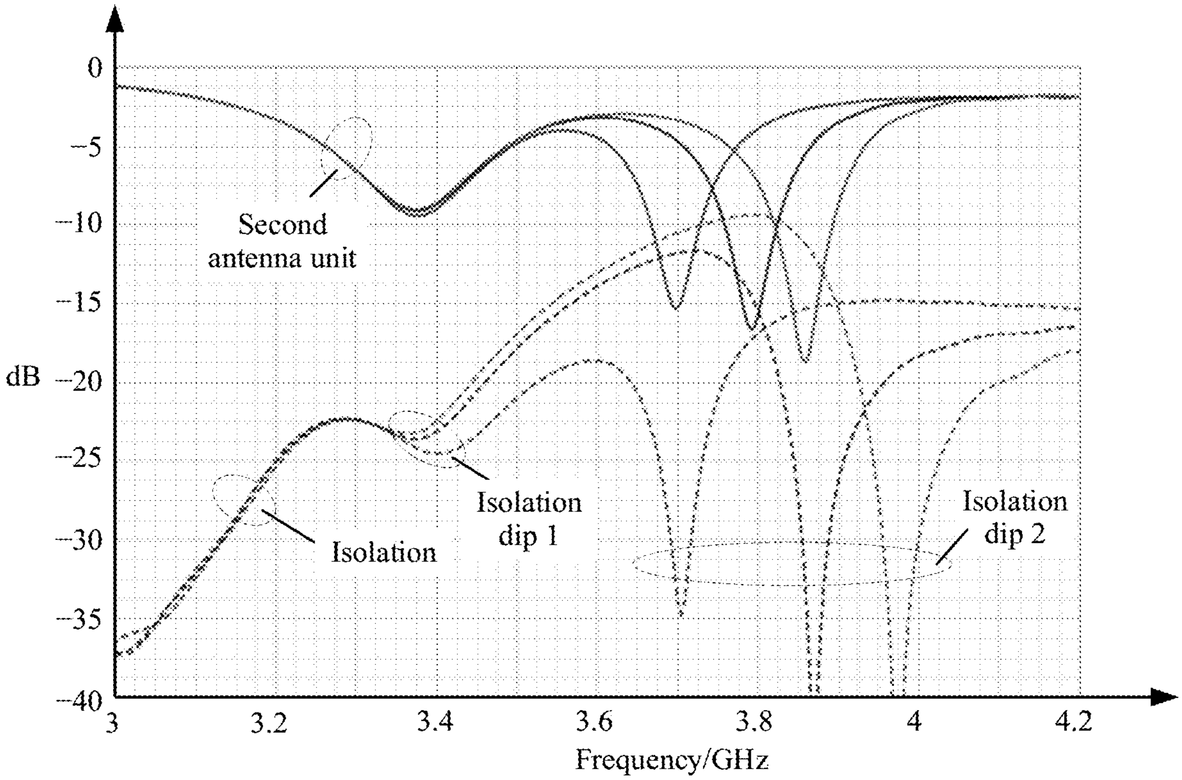
FIG. 24 is a diagram of a simulation result of an S parameter of a length change of a longitudinal branch in the antenna structure shown in FIG. 14.

FIG. 23 and FIG. 24 are diagrams of simulation results of S parameters of length changes of the right branch of the lateral branch and the longitudinal branch in the antenna structure shown in FIG. 14. FIG. 23 is a diagram of a simulation result of an S parameter of a length change of the right branch of the lateral branch in the antenna structure shown in FIG. 14. FIG. 24 is a diagram of a simulation result of an S parameter of a length change of the longitudinal branch in the antenna structure shown in FIG. 14.

As shown in FIG. 23, adjusting a length of the right branch of the lateral branch, that is, D1 of the antenna structure shown in FIG. 14, can effectively control a position of a high isolation point 1, but a position of a high isolation point 2 and a resonant frequency point of the second antenna unit basically remain varying.

As shown in FIG. 24, adjusting a length of the longitudinal branch, that is, D2 of the antenna structure shown in FIG. 14, can effectively control positions of the high isolation point 2 and the resonant frequency point of the second antenna unit, but the position of the high isolation point 1 basically remains varying.

It should be understood that, in the antenna structure provided in this embodiment of this application, the lengths of the lateral branch and the longitudinal branch may be adjusted alone to control the positions of the high isolation point 1 and the high isolation point 2.

Figure 25:
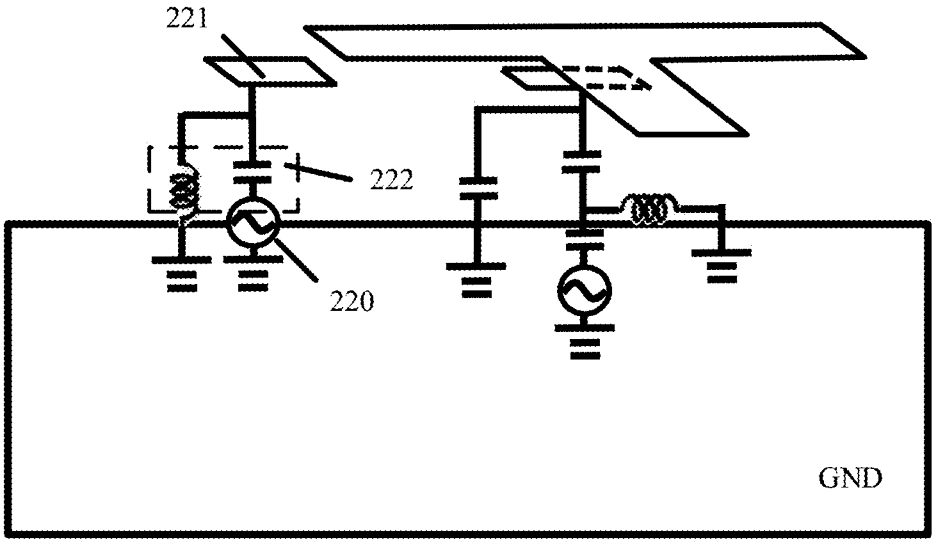
FIG. 25 is a schematic diagram of another antenna structure according to an embodiment of this application.

FIG. 25 is a schematic diagram of another antenna structure according to an embodiment of this application.

As shown in FIG. 25, on the basis of the antenna structure shown in FIG. 14, the antenna structure may further include a matching network 222 between the first feed unit 220 and the metal component 221. Other parts of the structure are the same as or similar to those of the antenna structure shown in FIG. 14. It should be understood that, parts of the structure shown in FIG. 25 that are the same as or similar to those shown in FIG. 14 have same or similar functions.

Figure 26:
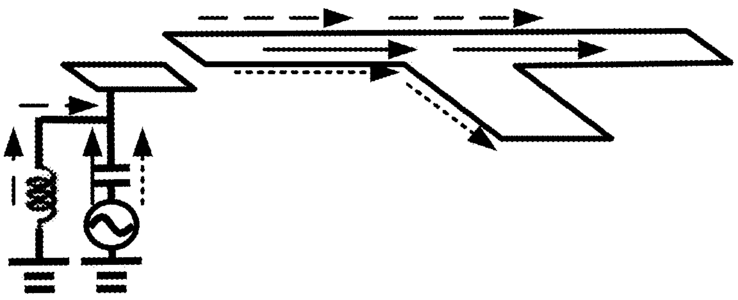
FIG. 26 shows a current path when a first feed unit performs feeding according to an embodiment of this application.

As shown in FIG. 26, when the first feed unit 220 performs feeding, the matching network 222 can generate an additional current path. Because the T-shaped antenna radiator can have two current paths, the antenna structure can excite three operating modes. A plurality of resonances that are generated can extend the operating frequency band of the first antenna unit formed by the first feed unit 220, to cover a wider communication frequency band.

Figure 27:
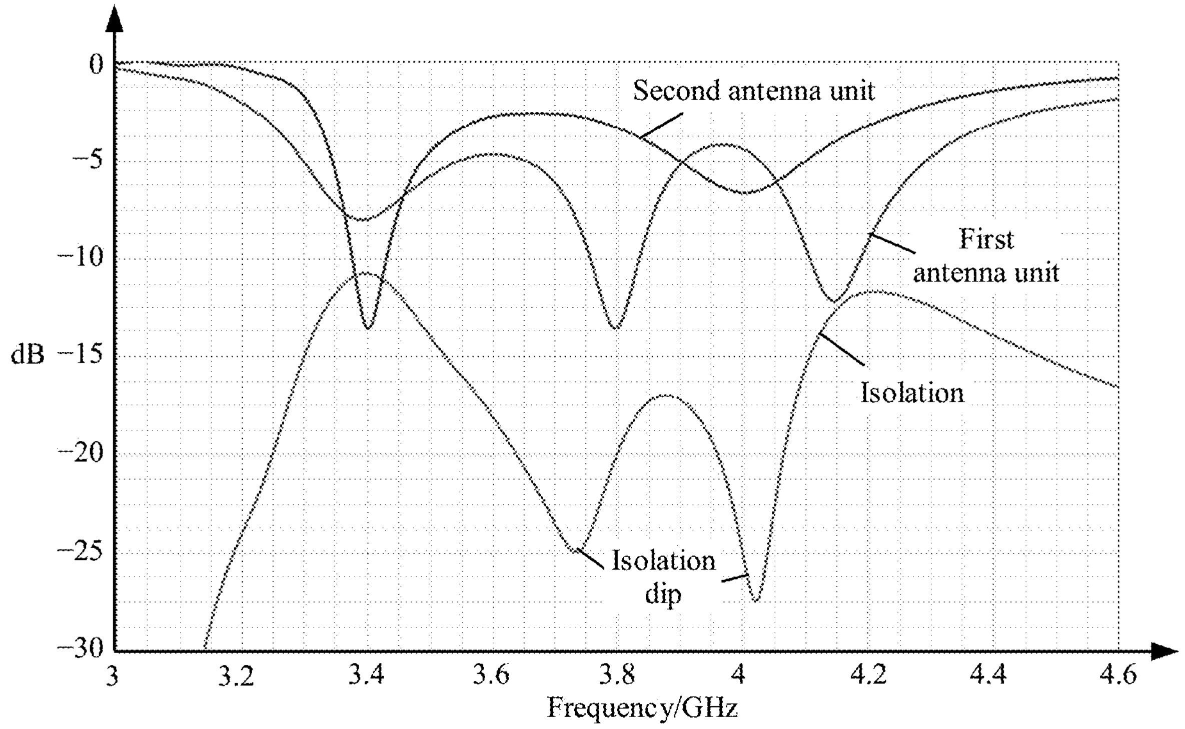
FIG. 27 is a diagram of a simulation result of an S parameter of the antenna structure shown in FIG. 25.
Figure 28:
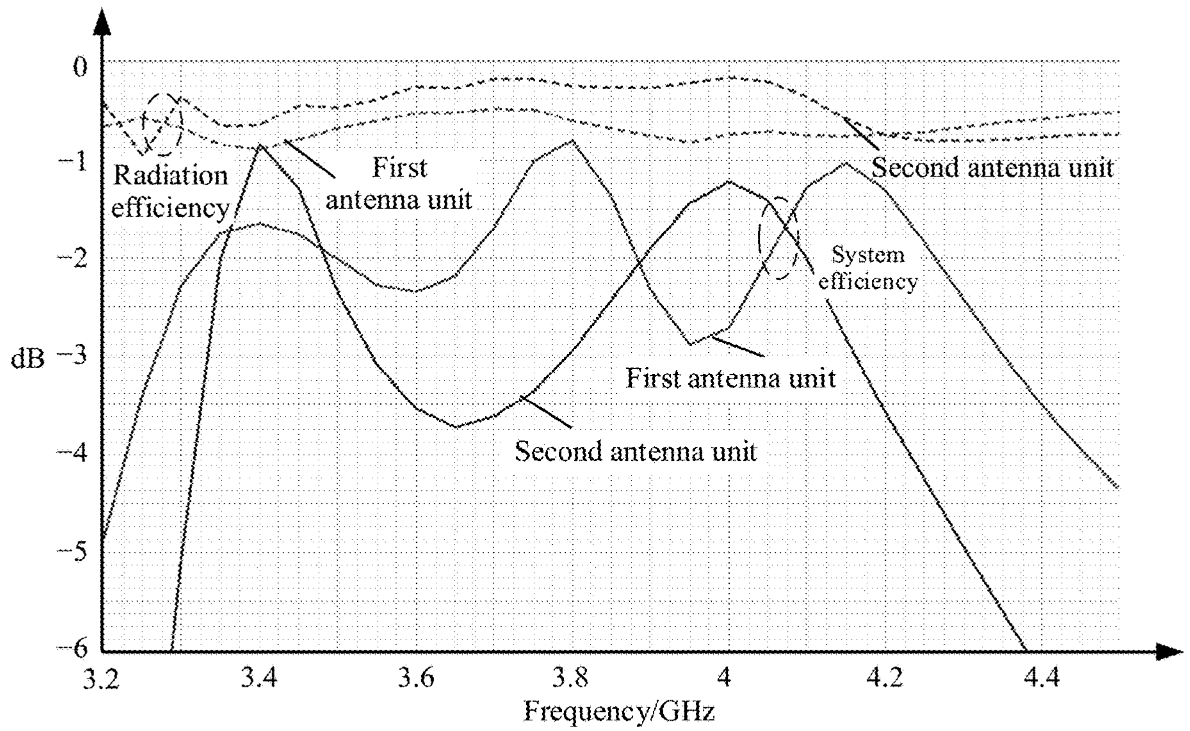
FIG. 28 is a diagram of simulation results of radiation efficiency and system efficiency of the antenna structure shown in FIG. 25.
Figure 29:
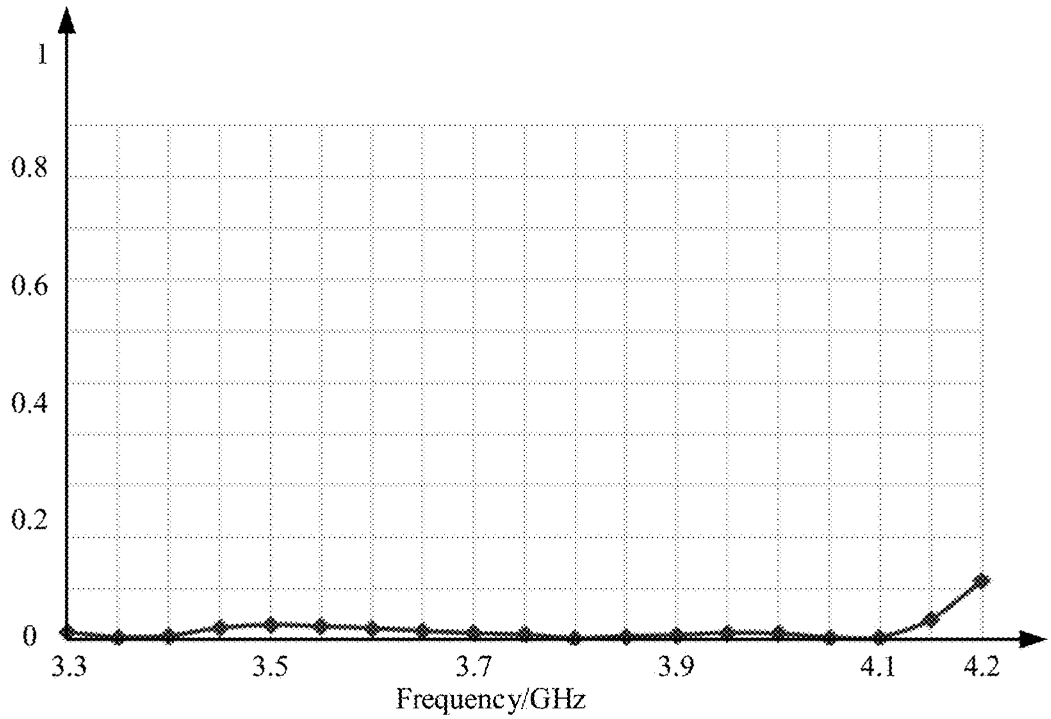
FIG. 29 is a diagram of a simulation result of an ECC of the antenna structure shown in FIG. 25.

FIG. 27 to FIG. 29 are diagrams of simulation results of the antenna structure shown in FIG. 25. FIG. 27 is a diagram of a simulation result of an S parameter of the antenna structure shown in FIG. 25. FIG. 28 is a diagram of simulation results of radiation efficiency and system efficiency of the antenna structure shown in FIG. 25. FIG. 29 is a diagram of a simulation result of an ECC of the antenna structure shown in FIG. 25.

As shown in FIG. 27, both the operating frequency bands of the first antenna unit formed by the antenna radiator and the first feed unit and the second antenna unit formed by the antenna radiator and the second feed unit can cover a frequency band of 3.3 GHZ to 4.2 GHZ. Isolation between the two antenna units on the operating frequency bands is greater than 10.7 dB, and there are two high isolation points.

It should be understood that, in this embodiment, for brevity of description, the 5G frequency band N77 is selected to be the operating frequency band of the antenna structure provided in embodiments of this application. In actual production or design, a parameter, for example, a size of the antenna structure may be changed, so that the antenna structure may cover another frequency band, for example, another 5G frequency band, or may cover a low frequency band (698 MHz to 960 MHZ), a mid frequency band (1,710 MHz to 2,170 MHZ), and a high frequency band (2,300 MHz to 2,690 MHZ) in LTE, a 2.4 GHZ/5 GHz Wi-Fi frequency band, or the like. This is not limited in this application.

As shown in FIG. 28, all system efficiency of the first antenna unit on a frequency band of 3.27 GHz to 4.35 GHz is greater than-3 dB, and all system efficiency of the second antenna unit on a frequency band of 3.31 GHz to 4.23 GHz is greater than −4 dB. An actual application requirement is met, and radiation efficiency can further meet a communication requirement.

As shown in FIG. 29, ECCs of both the first antenna unit and the second antenna unit are less than 0.12 on the frequency band of 3.3 GHZ to 4.2 GHZ, and the result is applicable to a MIMO system.

Figure 30:
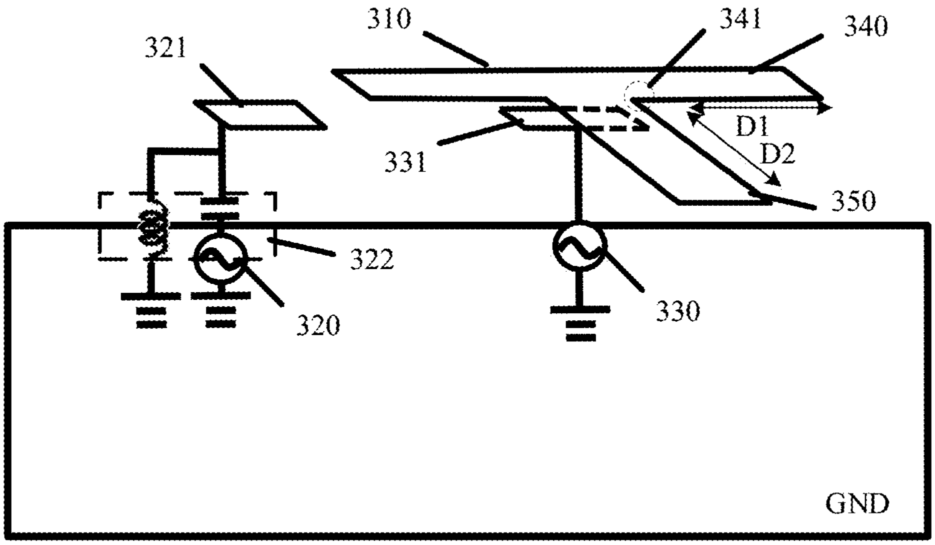
FIG. 30 is a schematic diagram of an antenna structure according to an embodiment of this application.
Figure 31:
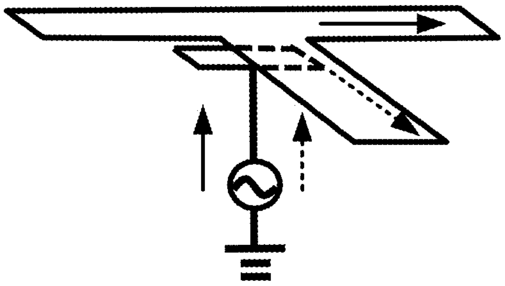
FIG. 31 shows a current path when a second feed unit performs feeding according to an embodiment of this application.
Figure 32:
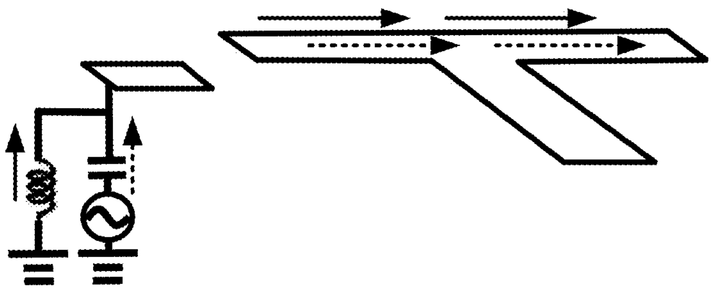
FIG. 32 shows a current path when a first feed unit performs feeding according to an embodiment of this application.

FIG. 30 to FIG. 32 are schematic diagrams of an antenna structure according to an embodiment of this application. The antenna may be applied to an electronic device. FIG. 30 is a schematic diagram of an antenna structure according to an embodiment of this application. FIG. 31 shows a current path when a second feed unit performs feeding according to an embodiment of this application. FIG. 32 shows a current path when a first feed unit performs feeding according to an embodiment of this application.

It should be understood that, compared with the antenna structure shown in FIG. 14, a length of a longitudinal branch 350 in the antenna structure shown in FIG. 30 is adjusted, so that a distance D1 between a first connection point 341 and a first endpoint 342 of a lateral branch 340 is less than the length D2 of the longitudinal branch 350. In this embodiment of this application, that D1=13.5 mm and D2=15 mm is used as an example for description. This is not limited in this application, and may be adjusted based on an internal space of the electronic device. Other parts of the structure are the same as or similar to those of the antenna structure shown in FIG. 14. It should be understood that, parts of the structure shown in FIG. 30 that are the same as or similar to those shown in FIG. 14 have same or similar functions.

As shown in FIG. 31, if D2>D1, when a second feed unit 330 performs feeding, two current paths can be generated on an antenna radiator 310. Therefore, two operating modes can be excited, and an operating frequency band of a second antenna unit formed by the antenna radiator 310 and the second feed unit 330 can be extended, to cover a wider communication frequency band.

In an embodiment, if D2>D1, when a first feed unit 320 performs feeding, only one current path can be generated on the antenna radiator 310. Therefore, the antenna structure may further include a matching network 322, between the first feed unit 320 and a metal component 321, that may be used to extend an operating frequency band of a first antenna unit formed by the antenna radiator 310 and the first feed unit 330. As shown in FIG. 32, when the first feed unit 320) performs feeding, the matching network 322 can generate an additional current path. Therefore, two operating modes can be excited. A plurality of resonances that are generated can extend the operating frequency band of the first antenna unit formed by the antenna radiator 310 and the first feed unit 330, to cover a wider communication frequency band.

Figure 33:
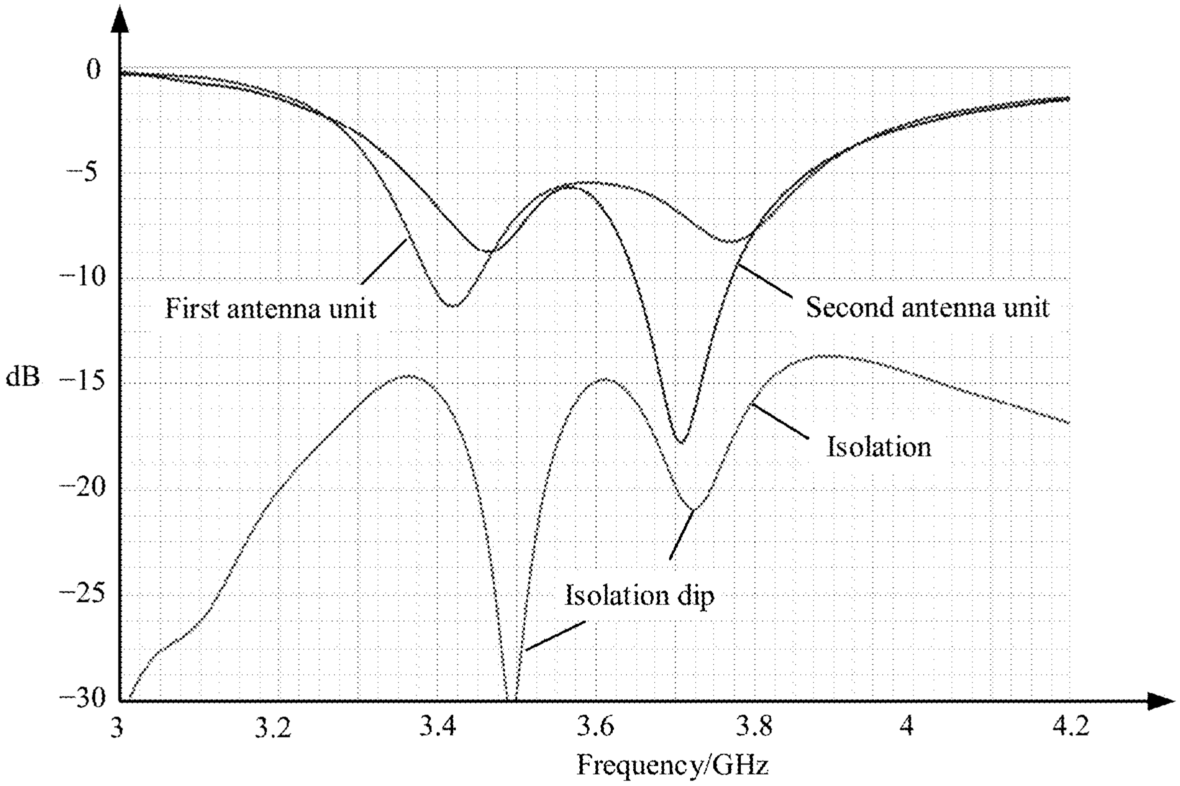
FIG. 33 is a diagram of a simulation result of an S parameter of the antenna structure shown in FIG. 30.
Figure 34:
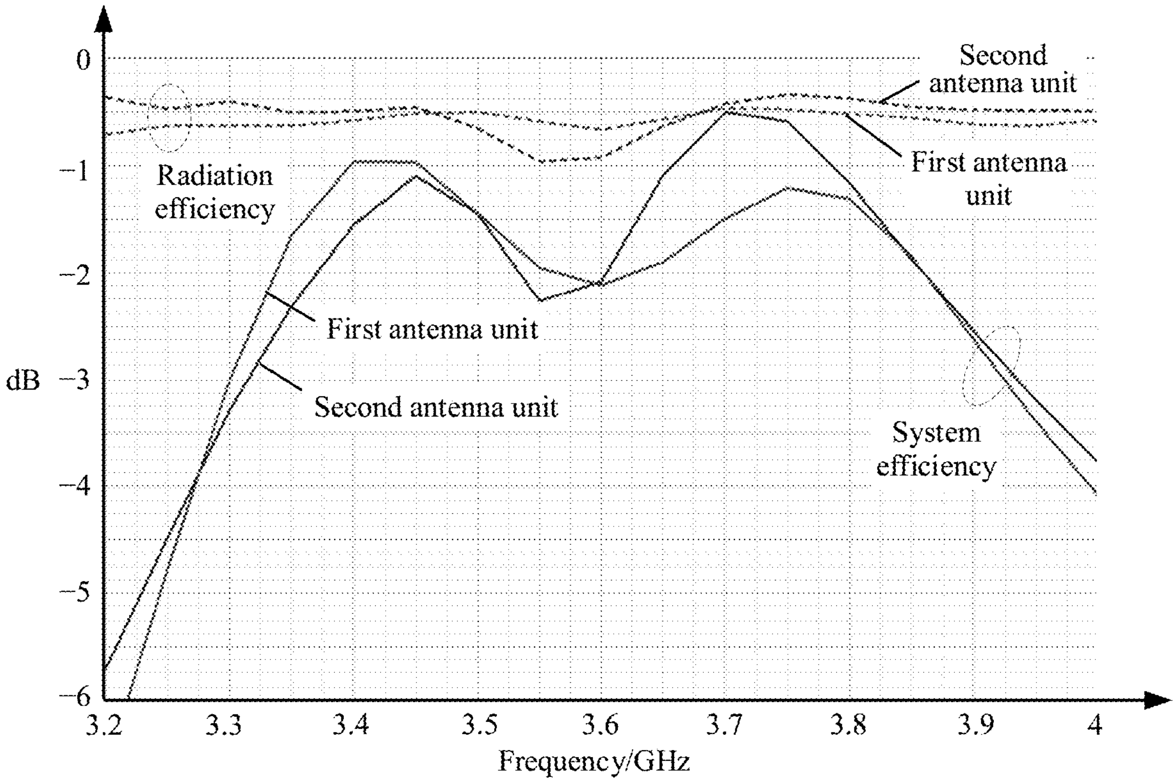
FIG. 34 is a diagram of simulation results of radiation efficiency and system efficiency of the antenna structure shown in FIG. 30.
Figure 35:
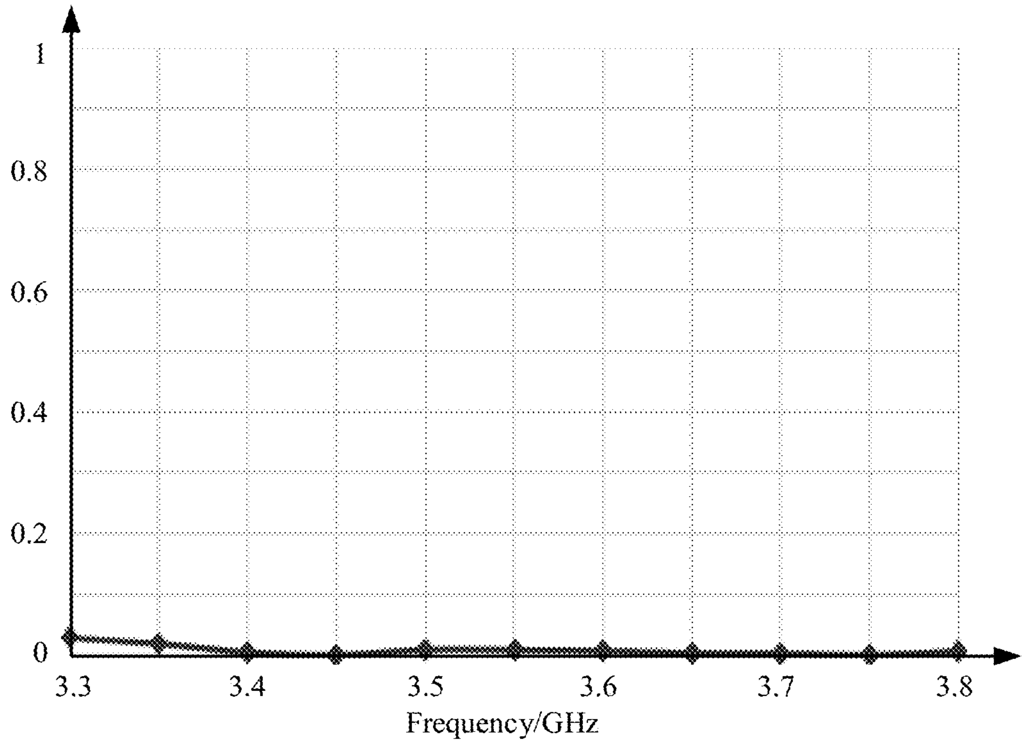
FIG. 35 is a diagram of a simulation result of an ECC of the antenna structure shown in FIG. 30.

FIG. 33 to FIG. 35 are diagrams of simulation results of the antenna structure shown in FIG. 30. FIG. 33 is a diagram of a simulation result of an S parameter of the antenna structure shown in FIG. 30. FIG. 34 is a diagram of simulation results of radiation efficiency and system efficiency of the antenna structure shown in FIG. 30. FIG. 35 is a diagram of a simulation result of an ECC of the antenna structure shown in FIG. 30.

As shown in FIG. 33, both the operating frequency bands of the first antenna unit formed by the antenna radiator and the first feed unit and the second antenna unit formed by the antenna radiator and the second feed unit can cover a frequency band of 3.3 GHZ to 3.9 GHZ. Isolation between the two antenna units on the operating frequency bands is greater than 13.7 dB, and there are two high isolation points.

It should be understood that, in this embodiment, for brevity of description, the 5G frequency band N78 is selected to be the operating frequency band of the antenna structure provided in embodiments of this application. In actual production or design, a parameter, for example, a size of the antenna structure may be changed, so that the antenna structure may cover another frequency band, for example, another 5G frequency band, or may cover a low frequency band (698 MHz to 960 MHZ), a mid frequency band (1,710 MHz to 2,170 MHz), and a high frequency band (2,300 MHz to 2,690 MHz) in LTE, a 2.4 GHz/5 GHz Wi-Fi frequency band, or the like. This is not limited in this application.

As shown in FIG. 34, system efficiency of both the first antenna unit and the second antenna unit on the frequency band of 3.3 GHZ to 3.9 GHz is greater than-3 dB, and radiation efficiency can further meet a communication requirement.

As shown in FIG. 35, ECCs of both the first antenna unit and the second antenna unit are less than 0.1 on the frequency band of 3.3 GHZ to 3.9 GHZ, and the result is applicable to a MIMO system.

Figure 36:
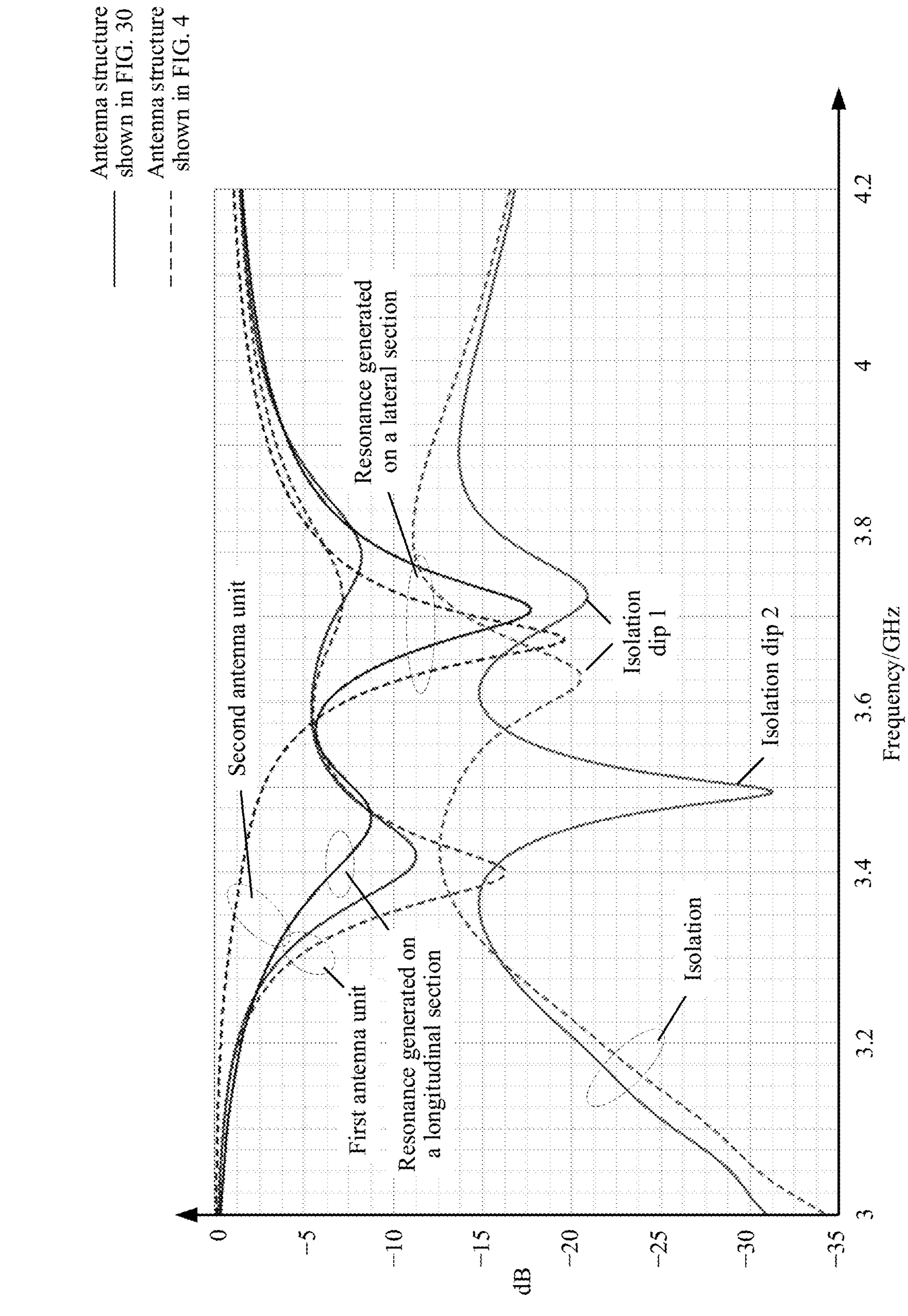
FIG. 36 is a diagram of a simulation result of an S parameter of the antenna structure shown in FIG. 30.

FIG. 36 is a diagram of a simulation result of an S parameter of the antenna structure shown in FIG. 30.

It should be understood that, compared with the antenna structure shown in FIG. 4, the longitudinal branch is added to the antenna structure shown in FIG. 30. When the matching network is added at the first feed unit in the antenna structure shown in FIG. 30 and the antenna structure shown in FIG. 4, but a feeding network is not added at the second feed unit, the simulation results of the S parameters of the antenna structure shown in FIG. 30 and the antenna structure shown in FIG. 4 are shown in FIG. 36.

After the longitudinal branch is added to the radiator in the antenna structure, another current path is added, and the antenna structure can excite another mode at a low frequency. As shown in FIG. 36, resonances generated by the two modes are used to extend a bandwidth of the antenna structure that may cover, for example, the 5G frequency band N78.

In addition, after the longitudinal branch is added to the radiator in the antenna structure, a high isolation point (a high isolation point 2) can be added at a low frequency, as shown in FIG. 36, to effectively improve isolation between the first antenna unit and the second antenna unit on the operating frequency band.

Figure 37:
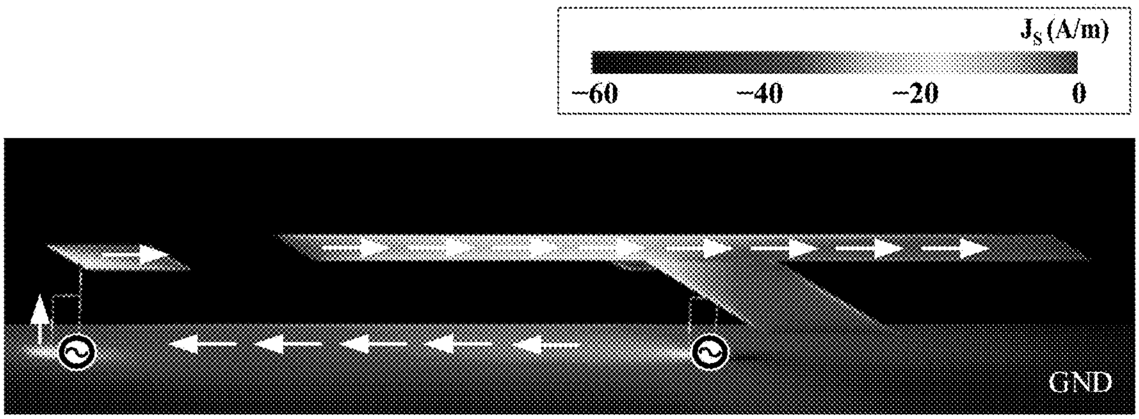
FIG. 37 is a diagram of current distribution of the antenna structure shown in FIG. 30 when the first feed unit performs feeding.
Figure 37:
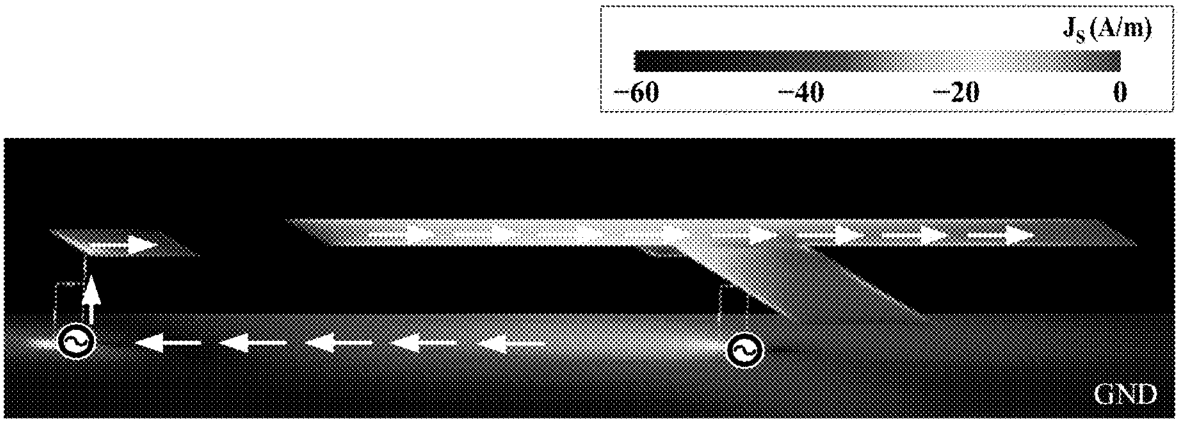
Figure 38:
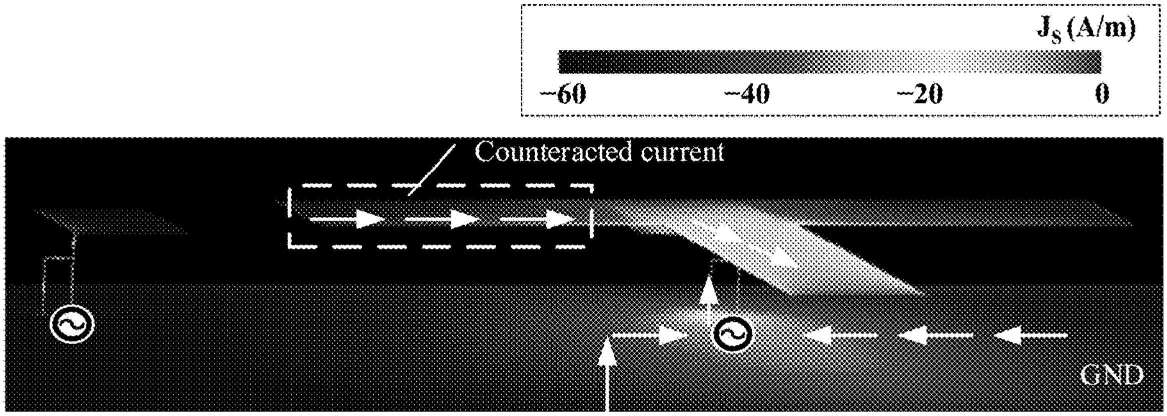
FIG. 38 is a diagram of current distribution of the antenna structure shown in FIG. 30 when the second feed unit performs feeding.
Figure 38:
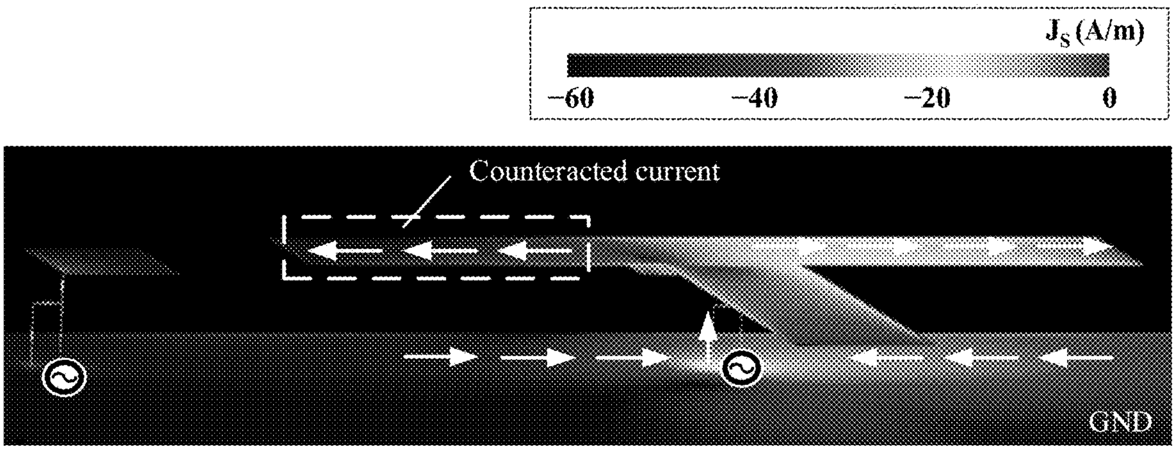

FIG. 37 and FIG. 38 are diagrams of current distribution of the antenna structure shown in FIG. 30. FIG. 37 is a diagram of current distribution of the antenna structure shown in FIG. 30 when the first feed unit performs feeding. FIG. 38 is a diagram of current distribution of the antenna structure shown in FIG. 30 when the second feed unit performs feeding.

As shown in FIG. 37, when the first feed unit performs feeding, because the matching network generates two current paths, two current paths can be generated. Correspondingly, two operating modes can be excited, and two resonances are generated. (a) and (b) in FIG. 37 each correspond to a different current path.

As shown in FIG. 38, when the second feed unit performs feeding, because the antenna radiator includes the lateral branch and the longitudinal branch, two operating modes can be excited, and two resonances are generated. (a) and (b) in FIG. 38 each correspond to a different current path.

It should be understood that, as shown in FIG. 37, in a case of 3.42 GHZ and 3.78 GHZ, a differential mode current of the first antenna unit is mainly distributed on the lateral branch. Therefore, the two resonances generated by the first antenna unit are completed by the lateral branch. However, as shown in FIG. 38, in a case of 3.47 GHZ, a common mode current of the second antenna unit is distributed on a right branch of the longitudinal branch. In a case of 3.74 GHz, the common mode current of the second antenna unit is distributed on a right branch of the lateral branch. In addition, at the two frequencies, a current on a left branch of the lateral branch is very weak. This is because a differential mode current and the common mode current on the left branch of the lateral branch are opposite in direction and counteract each other, and current coupling between the first feed unit and the second feed unit can be effectively reduced, so that good isolation can be maintained between the first antenna unit and the second antenna unit.

Figure 39:
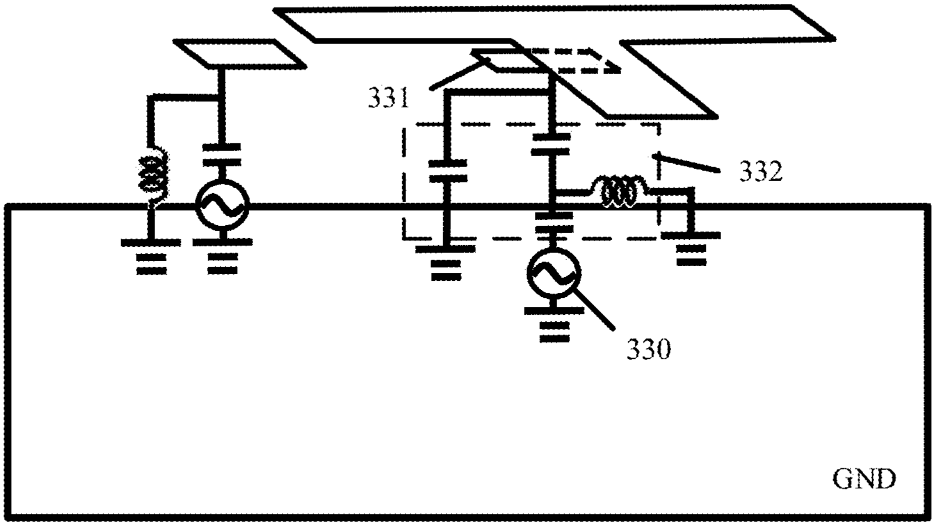
FIG. 39 is a schematic diagram of another antenna structure according to an embodiment of this application.

FIG. 39 is a schematic diagram of another antenna structure according to an embodiment of this application.

As shown in FIG. 39, on the basis of the antenna structure shown in FIG. 30, the antenna structure may further include a matching network 332 between the second feed unit 330) and a metal component 331. Other parts of the structure are the same as or similar to those of the antenna structure shown in FIG. 30. It should be understood that, structures shown in FIG. 39 that are the same as or similar to those shown in FIG. 30 have same or similar functions.

Figure 40:
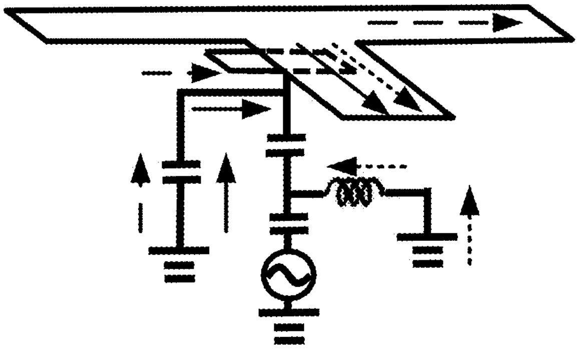
FIG. 40 shows a current path when a second feed unit performs feeding according to an embodiment of this application.

As shown in FIG. 40, when the second feed unit 330 performs feeding, the matching network 332 can generate an additional current path. Because the T-shaped antenna radiator can have two current paths, the antenna structure can excite three operating modes. A plurality of resonances that are generated can extend the operating frequency band of the second antenna unit formed by the second feed unit 330, to cover a wider communication frequency band, for example, a 5G frequency band N77.

Figure 41:
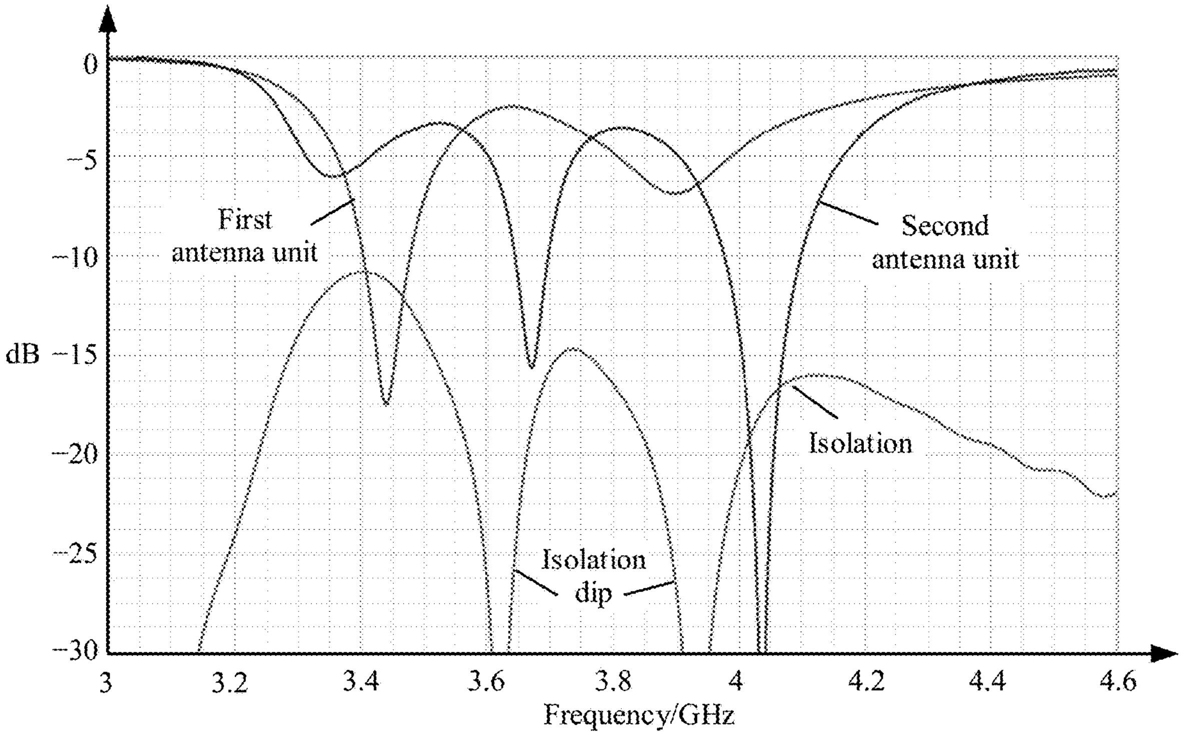
FIG. 41 is a diagram of a simulation result of an S parameter of the antenna structure shown in FIG. 39.
Figure 42:
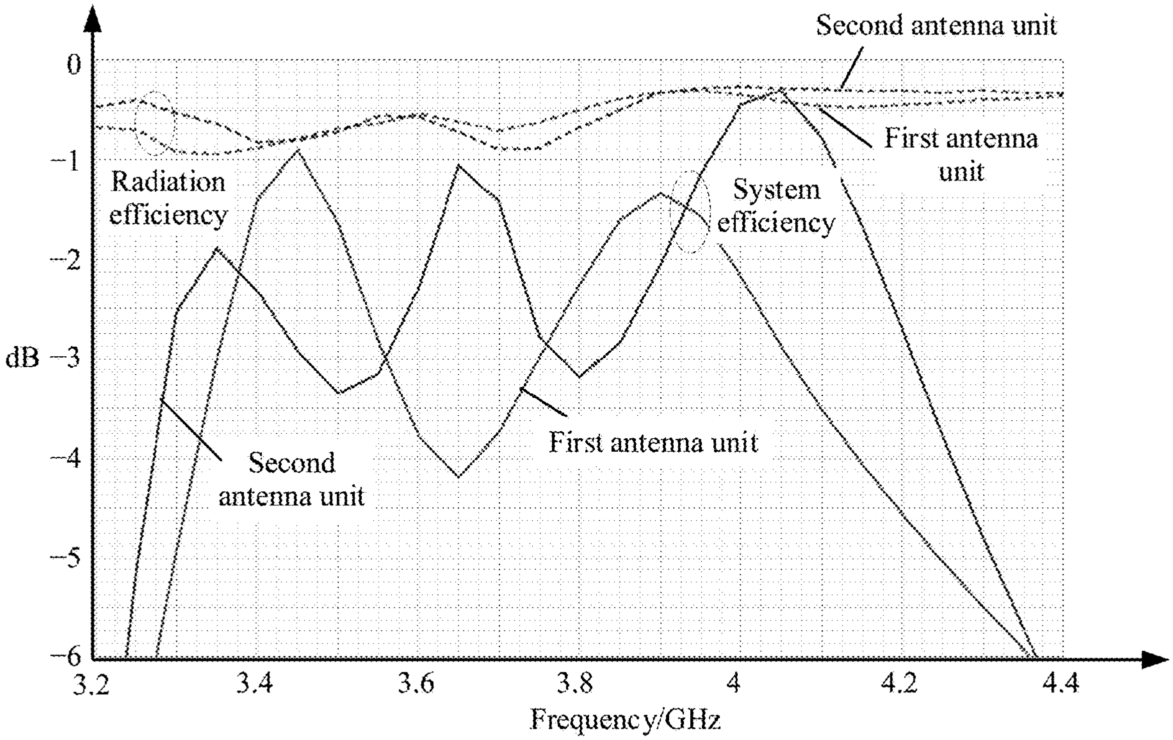
FIG. 42 is a diagram of simulation results of radiation efficiency and system efficiency of the antenna structure shown in FIG. 39.
Figure 43:
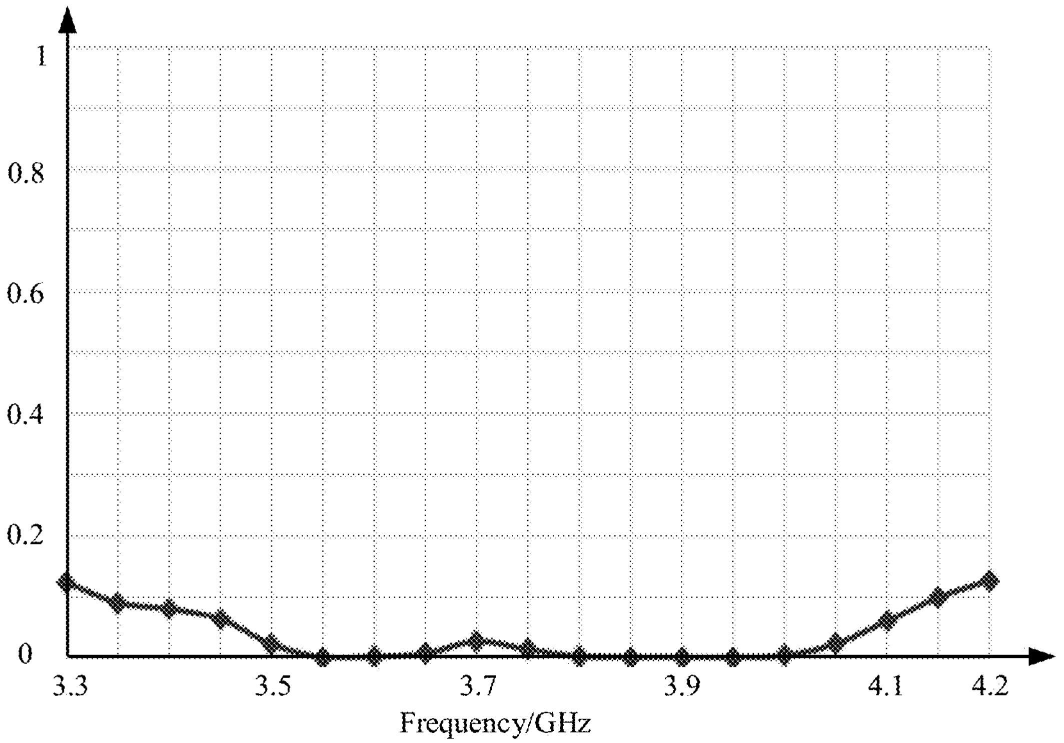
FIG. 43 is a diagram of a simulation result of an ECC of the antenna structure shown in FIG. 39.

FIG. 41 to FIG. 43 are diagrams of simulation results of the antenna structure shown in FIG. 39. FIG. 41 is a diagram of a simulation result of an S parameter of the antenna structure shown in FIG. 39. FIG. 42 is a diagram of simulation results of radiation efficiency and system efficiency of the antenna structure shown in FIG. 39. FIG. 43 is a diagram of a simulation result of an ECC of the antenna structure shown in FIG. 39.

As shown in FIG. 41, both the operating frequency bands of the first antenna unit formed by the antenna radiator and the first feed unit and the second antenna unit formed by the antenna radiator and the second feed unit can cover a frequency band of 3.3 GHZ to 4.2 GHZ. Isolation between the two antenna units on the operating frequency bands is greater than 10.8 dB, and there are two high isolation points.

It should be understood that, in this embodiment, for brevity of description, the 5G frequency band N77 is selected to be the operating frequency band of the antenna structure provided in embodiments of this application. In actual production or design, a parameter, for example, a size of the antenna structure may be changed, so that the antenna structure may cover another frequency band, for example, another 5G frequency band, or may cover a low frequency band (698 MHz to 960 MHZ), a mid frequency band (1,710 MHz to 2,170 MHZ), and a high frequency band (2,300 MHz to 2,690 MHZ) in LTE, a 2.4 GHZ/5 GHz Wi-Fi frequency band, or the like. This is not limited in this application.

As shown in FIG. 42, all system efficiency of the first antenna unit on a frequency band of 3.3 GHZ to 4.2 GHz is greater than −4.5 dB, and all system efficiency of the second antenna unit on a frequency band of 3.287 GHZ to 4.24 GHz is greater than-3.5 dB. An actual application requirement is met, and radiation efficiency can further meet a communication requirement.

As shown in FIG. 43, ECCs of both the first antenna unit and the second antenna unit are less than 0.13 on the frequency band of 3.3 GHZ to 4.2 GHZ, and the result is applicable to a MIMO system.

Figure 44:
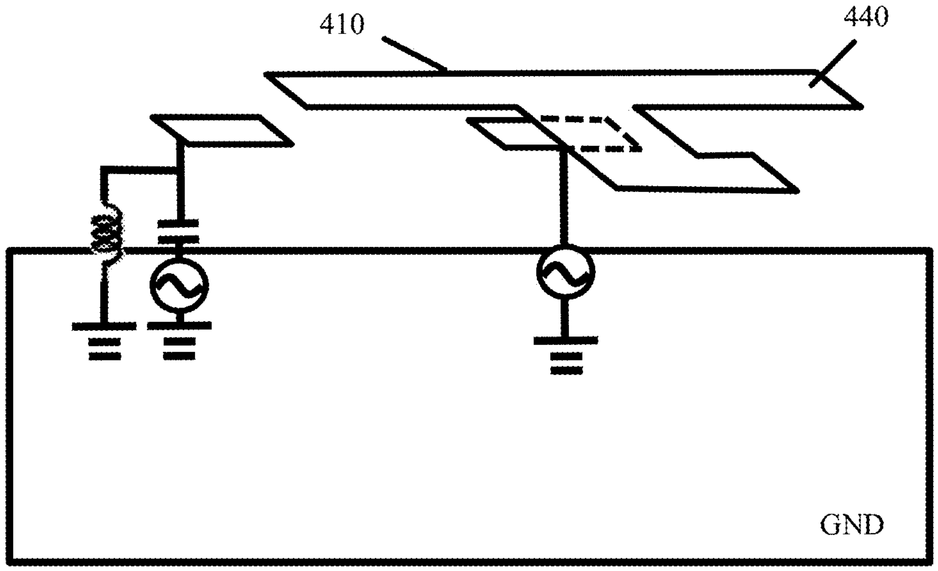
FIG. 44 is a schematic diagram of another antenna structure according to an embodiment of this application.

FIG. 44 is a schematic diagram of another antenna structure according to an embodiment of this application.

As shown in FIG. 44, on the basis of the antenna structure shown in FIG. 14, to further reduce a space inside the electronic device occupied by the antenna structure, a branch of an antenna radiator 410 is bent, and other parts of the structure are the same as or similar to those of the antenna structure shown in FIG. 14. It should be understood that, structures shown in FIG. 44 that are the same as or similar to those shown in FIG. 14 have same or similar functions.

In an embodiment, an end of a longitudinal branch 450 that is away from a lateral branch 440) may be bent, and may be bent on a two-dimensional plane (a plane on which the lateral branch is located), or may be bent in three-dimensional space, for example, bent toward a rear cover or a screen. Selection may be made based on an actual layout inside the electronic device.

Figure 45:
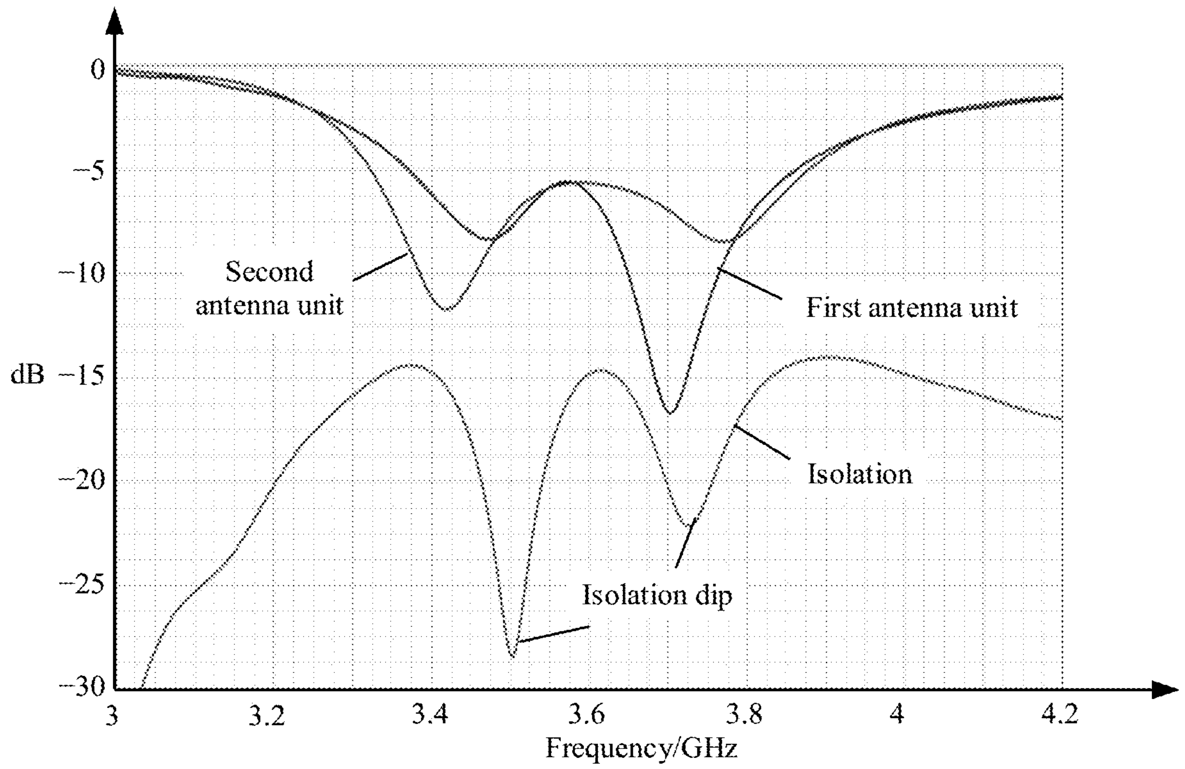
FIG. 45 is a diagram of a simulation result of an S parameter of the antenna structure shown in FIG. 44.
Figure 46:
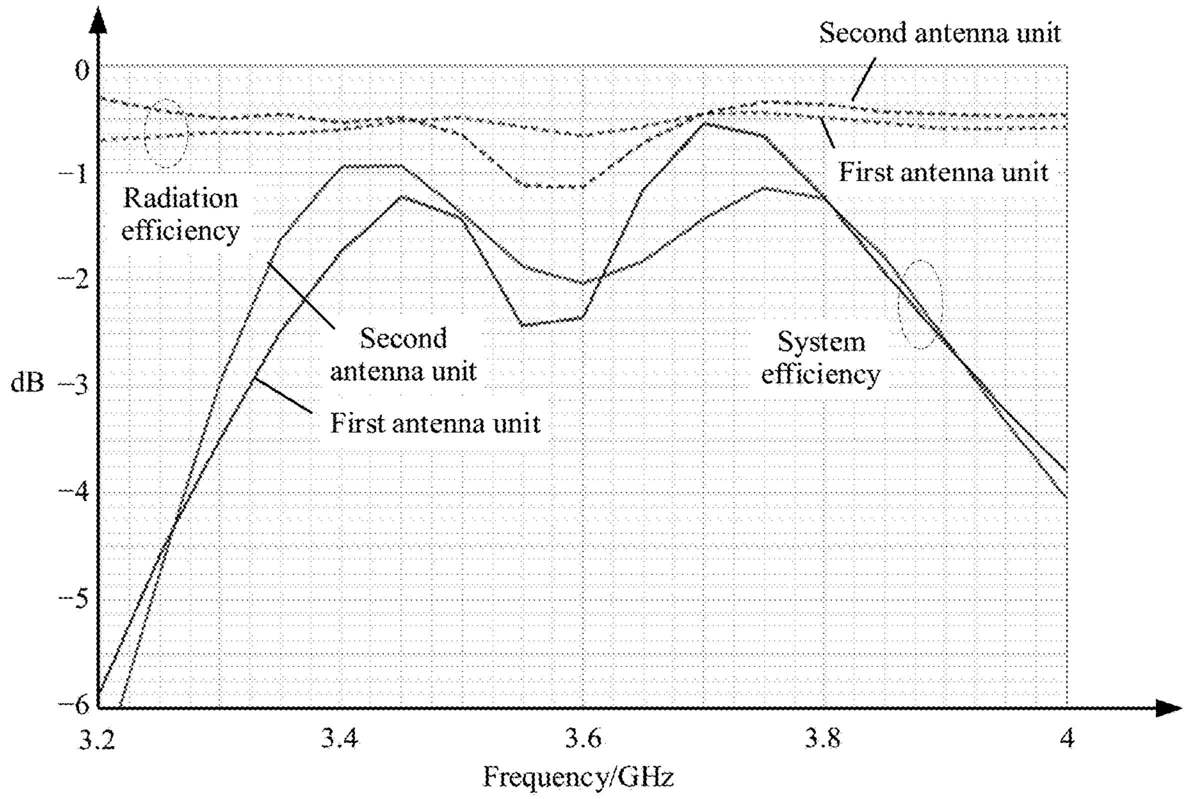
FIG. 46 is a diagram of simulation results of radiation efficiency and system efficiency of the antenna structure shown in FIG. 44.

FIG. 45 and FIG. 46 are diagrams of simulation results of the antenna structure shown in FIG. 44. FIG. 45 is a diagram of a simulation result of an S parameter of the antenna structure shown in FIG. 44. FIG. 46 is a diagram of simulation results of radiation efficiency and system efficiency of the antenna structure shown in FIG. 44.

As shown in FIG. 45, after the end of the longitudinal branch that is away from the lateral branch is bent, both the operating frequency bands of the first antenna unit formed by the antenna radiator and the first feed unit and the second antenna unit formed by the antenna radiator and the second feed unit can still cover the frequency band of 3.3 GHZ to 3.9 GHZ. Isolation between the two antenna units on the operating frequency bands is greater than 14 dB, and there are two high isolation points.

As shown in FIG. 46, system efficiency of both the first antenna unit and the second antenna unit on the frequency band of 3.3 GHZ to 3.9 GHZ is greater than-2.5 dB. An actual application requirement is met, and radiation efficiency can further meet a communication requirement.

FIG. 47 to FIG. 51 are schematic diagrams of a layout of an antenna array according to an embodiment of this application.

It should be understood that the antenna structure provided in embodiments of this application has a simple structure and a small volume, and may be used as a subunit in a MIMO system. For brevity of description, an example in which the antenna structure shown in FIG. 4 is used as the subunit in the MIMO system is used only. The subunit in the MIMO system may alternatively be any antenna structure described in the foregoing embodiments.

In the antenna array of the MIMO system, subunits may be arranged as spaced from each other in order to form the array. A head of a radiator of each subunit is spaced from a tail of another radiator. For example, a first end of a lateral branch of a first subunit is closer to a second end of a lateral branch of a second subunit, and the first end of the lateral branch of the first subunit is away from a first end of the lateral branch of the second subunit, where the first subunit and the second subunit are any two adjacent subunits of the antenna array of the MIMO system.

Figure 47:
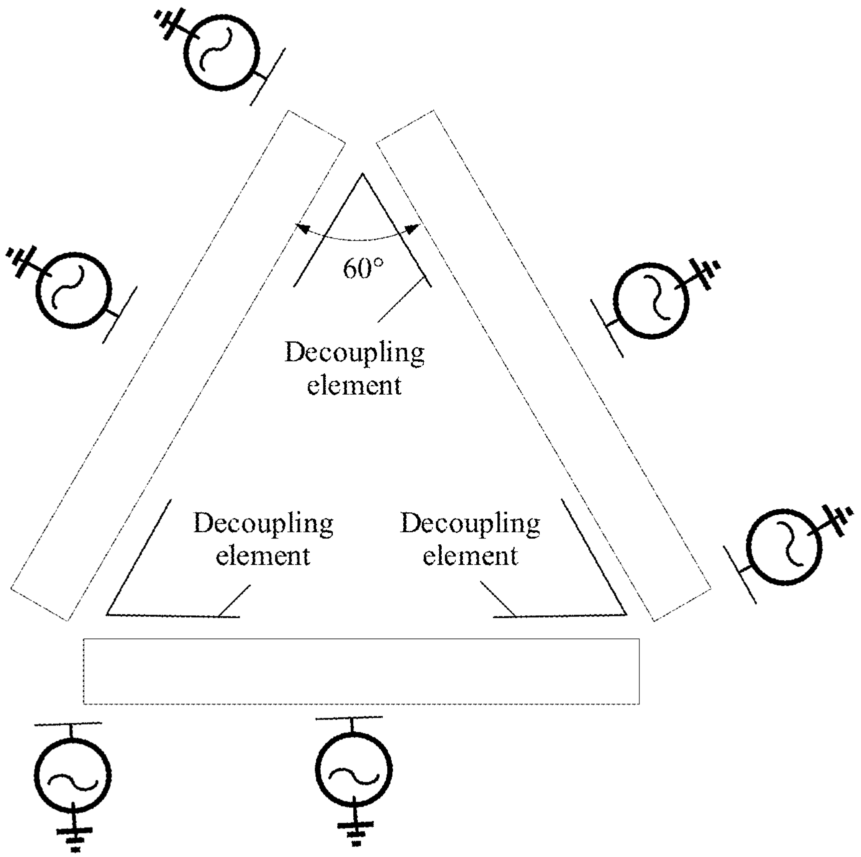
FIG. 47 is a schematic diagram of a layout of an antenna array according to an embodiment of this application.
Figure 48:
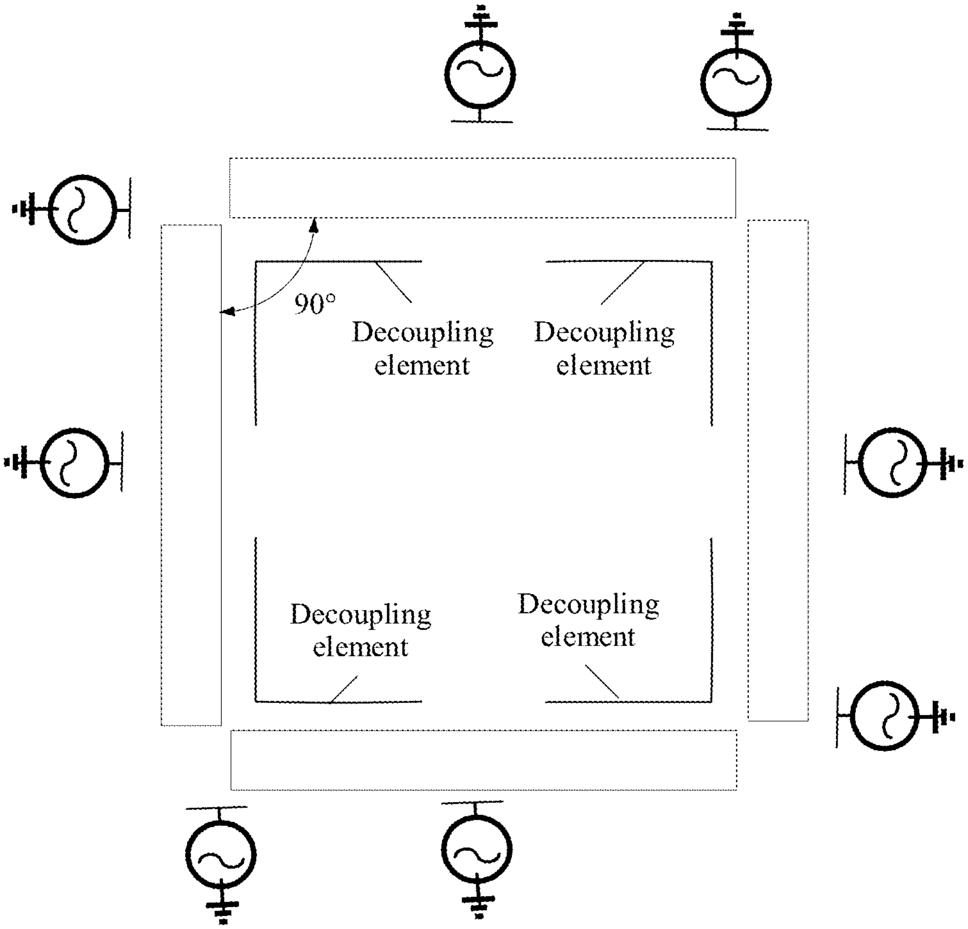
FIG. 48 is a schematic diagram of a layout of an antenna array according to an embodiment of this application.
Figure 49:
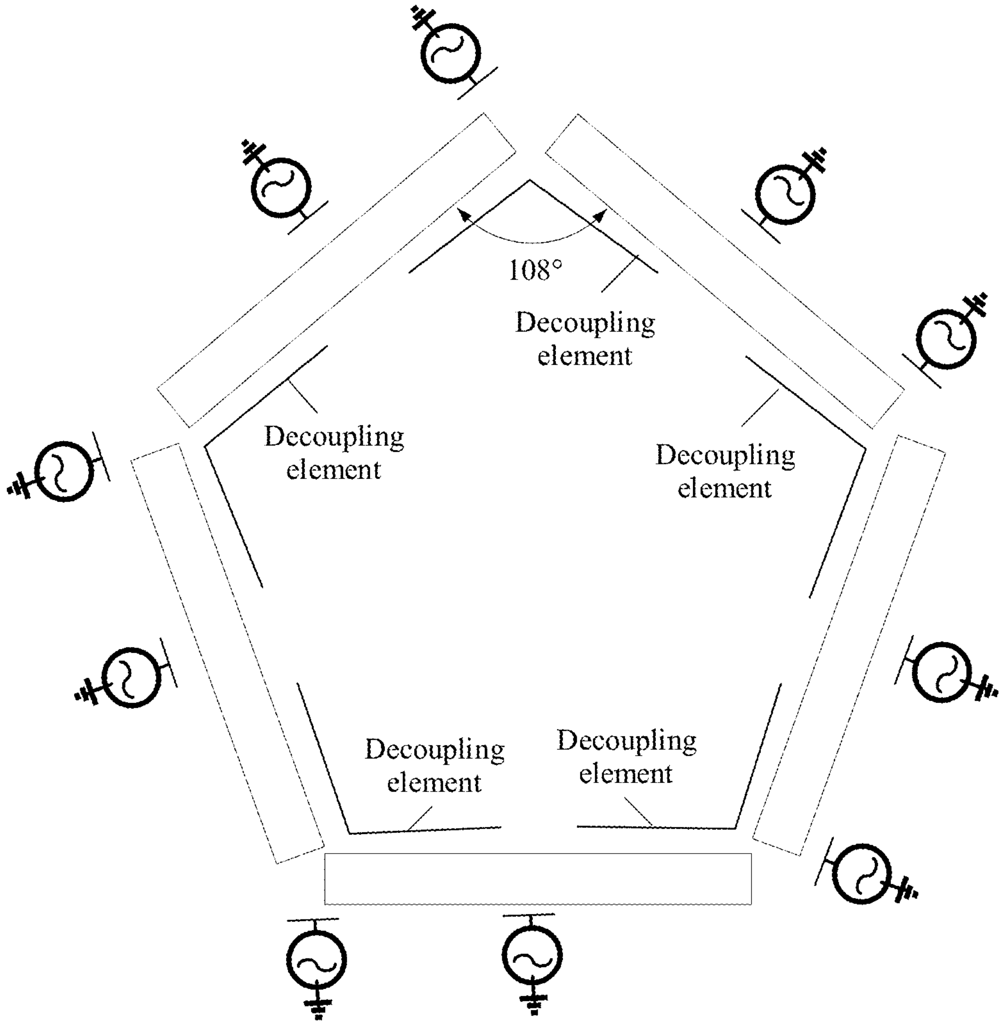
FIG. 49 is a schematic diagram of a layout of an antenna array according to an embodiment of this application.
Figure 50:
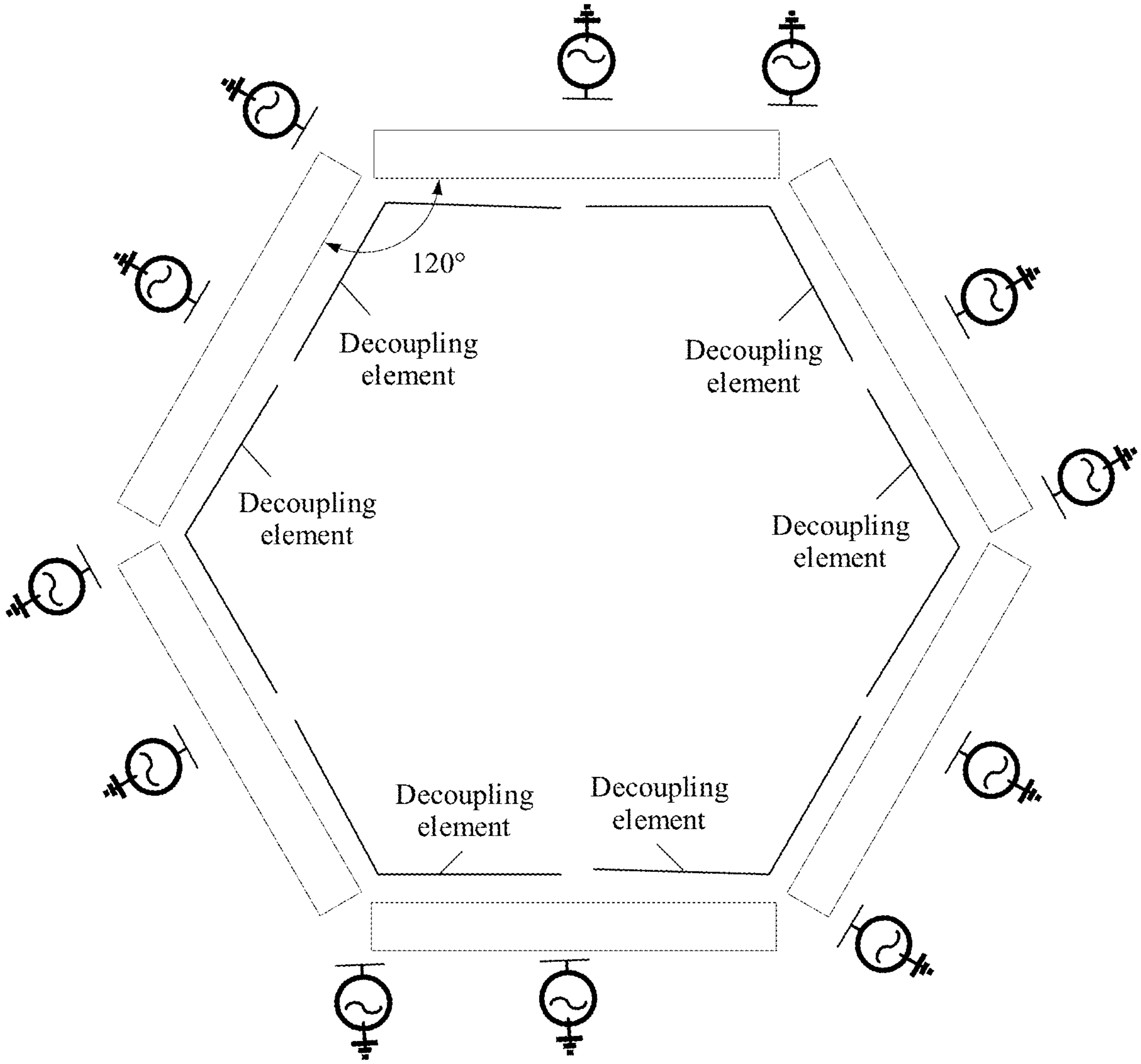
FIG. 50 is a schematic diagram of a layout of an antenna array according to an embodiment of this application.
Figure 51:
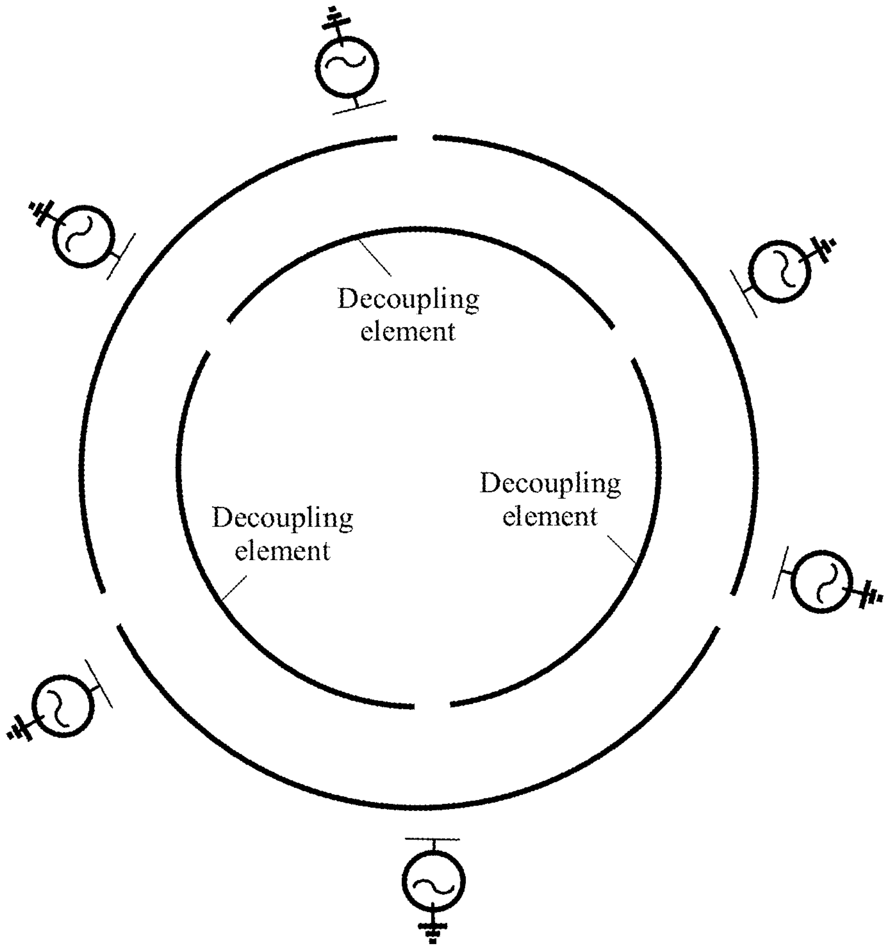
FIG. 51 is a schematic diagram of a layout of an antenna array according to an embodiment of this application.

In an embodiment, subunits may be distributed to form a triangle, as shown in FIG. 47, may be distributed to form a square, as shown in FIG. 48, may be arranged to form a polygon, as shown in FIG. 49 and FIG. 50, or may form a circle, as shown in FIG. 51. As a same radiator is shared by two antenna units in the antenna structure provided in this embodiment of this application, when the plurality of subunits of the antenna array are distributed to form an N-side polygon, a quantity of antennas corresponding to the antenna array is 2N (N is a positive integer greater than or equal to 2). For example, if three subunits are arranged to form a triangle, six antennas may be configured, if four subunits are arranged to form a quadrangle, eight antennas may be configured, or if a plurality of subunits are arranged to form a hexagon, there are 12 antennas. N antennas may be used as transmit antennas, and N antennas may be used as receive antennas, to improve a transmission rate of the electronic device.

In an embodiment, the electronic device may further include a decoupling element that may be disposed, in the antenna array of the MIMO system, between radiators of any two subunits but not connected to a branch of a subunit, and form gaps with the radiators of the subunits. The gap may be used to adjust a coupling amount between the radiators of the two subunits, may be used to enable the antenna array to have a plurality of high isolation points on an operating frequency band, and may improve near-field current coupling between a plurality of subunits.

In several embodiments provided in this application, it should be understood that the disclosed system, apparatus, and method may be implemented in another manner. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual coupling or direct coupling or communication connections may be implemented through some interfaces. The indirect coupling or communication connections between the apparatuses or units may be implemented in electronic or other forms.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An electronic device, comprising:

a radiator, a first feed circuit, a second feed circuit, a first metal component and a second metal component, wherein the radiator comprises a first branch, and the first feed circuit feeds the radiator at a first end of the first branch, wherein the first feed circuit is electrically connected to the first metal component to indirectly coupled feed the radiator;

the second feed circuit feeds the radiator at a first position in the first branch, wherein the second feed circuit is electrically connected to the second metal component to indirectly coupled feed the radiator; and the first position is in an area with a largest current in the first branch when the first feed circuit performs feeding and the second feed circuit does not perform feeding.

2. The electronic device according to claim 1, wherein the radiator further comprises a second branch, one end of the second branch is connected to the first branch, and the radiator has a T-shaped structure.

3. The electronic device according to claim 2, wherein a distance between a first connection point and a first endpoint of the first branch is less than or equal to a length of the second branch; and the first connection point is a connection point of connection points between the first branch and the second branch that is away from the first feed circuit, and the first endpoint of the first branch is an endpoint of the first branch that is away from the first feed circuit.

4. The electronic device according to claim 2, wherein an end of the second branch that is away from the first branch is bent.

5. The electronic device according to claim 2, wherein lengths of two areas of the first branch on two sides of the first position are the same.

6. The electronic device according to claim 2, wherein the first position is at a joint of the first branch and the second branch.

7. The electronic device according to claim 2, wherein a length of the first branch is one half of a first wavelength, and the first wavelength is an operating wavelength of an antenna circuit formed by the first feed circuit or the second feed circuit, and the radiator.

8. The electronic device according to claim 2, wherein a current in the first branch and a current in the second branch that are excited by the first feed circuit flow in a same direction; and a current in the first branch and a current in the second branch that are excited by the second feed circuit flow toward the first position.

9. The electronic device according to claim 1, wherein the electronic device further comprises:

a first matching network, wherein the first matching network is provided between the first feed circuit and the first metal component, and is configured to extend an operating frequency band of a first antenna circuit formed by the first feed circuit.

10. The electronic device according to claim 1, wherein the electronic device further comprises:

a second matching network, wherein the second matching network is provided between the second feed circuit and the second metal component, and is configured to extend an operating frequency band of a second antenna circuit formed by the second feed circuit.

11. The electronic device according to claim 1, wherein the electronic device further comprises a rear cover and a support;

the first metal component and the second metal component are disposed on a surface of the support; and the radiator is disposed on a surface of the rear cover.

12. The electronic device according to claim 1, wherein operating frequency bands of a first antenna circuit formed by the first feed circuit and a second antenna circuit formed by the second feed circuit are the same.

13. The electronic device according to claim 1, wherein an operating frequency band of a first antenna circuit formed by the first feed circuit covers 3.3 GHz to 3.8 GHz; and an operating frequency band of a second antenna circuit formed by the second feed circuit covers 3.3 GHz to 3.8 GHz.

14. The electronic device according to claim 1, wherein the electronic device comprises an antenna array formed by a plurality of radiators spaced from each other in order and at least one decoupling element;

in two adjacent radiators of the plurality of radiators, a first end of a first branch of one radiator is close to a second end of a first branch of another radiator; and the at least one decoupling element is not directly connected to the plurality of radiators, and a corresponding decoupling element of the at least one decoupling element is disposed between the two adjacent radiators.

15. The electronic device according to claim 14, wherein the plurality of radiators are distributed to form a triangle, a circle, or a polygon.

16. The electronic device according to claim 14, wherein operating frequency bands of subcircuits formed by one of the radiators in the antenna array are the same.

17. The electronic device according to claim 14, wherein there is a gap between the two adjacent radiators and a corresponding decoupling element, and a degree of coupling between the two adjacent radiators is related to a size of the gap.

18. The electronic device according to claim 17, wherein the decoupling element is configured to enable the antenna array to have a plurality of high isolation points on an operating frequency band.

19. A terminal, comprising:

a display screen; and an antenna, comprising:

a radiator, a first feed circuit, a second feed circuit, a first metal component and a second metal component, wherein the radiator comprises a first branch, and the first feed circuit feeds the radiator at a first end of the first branch, wherein the first feed circuit is electrically connected to the first metal component to indirectly coupled feed the radiator;

the second feed circuit feeds the radiator at a first position in the first branch, wherein the second feed circuit is electrically connected to the second metal component to indirectly coupled feed the radiator; and the first position is in an area with a largest current in the first branch when the first feed circuit performs feeding and the second feed circuit does not perform feeding.

20. The terminal according to claim 19, wherein the radiator further comprises a second branch, one end of the second branch is connected to the first branch, and the radiator has a T-shaped structure.

* * * * *